(12) United States Patent
Thompson et al.

(10) Patent No.: US 11,181,489 B2
(45) Date of Patent: Nov. 23, 2021

(54) DETERMINING TILT ANGLE IN PATTERNED ARRAYS OF HIGH ASPECT-RATIO STRUCTURES BY SMALL-ANGLE X-RAY SCATTERING

(71) Applicants: Lam Research Corporation, Fremont, CA (US); Government of the USA, as represented by the Secretary of Commerce., Gaithersburg, MD (US)

(72) Inventors: William Dean Thompson, Pleasanton, CA (US); Regis Joseph Kline, Boonsboro, MD (US); Daniel F. Sunday, Gaithersburg, MD (US); Wenli Wu, Rockville, MD (US); Osman Sorkhabi, Danville, CA (US); Jin Zhang, Fremont, CA (US); Xiaoshu Chen, Fremont, CA (US)

(73) Assignees: Lam Research Corporation, Fremont, CA (US); The Government of the United States of America, represented by the Secretary of Commerce, National Institute of Standards and Technology, Gaithersburg, MD (US)

( * ) Notice: Subject to any disclaimer, the term of this patent is extended or adjusted under 35 U.S.C. 154(b) by 0 days.

(21) Appl. No.: 16/526,858

(22) Filed: Jul. 30, 2019

(65) Prior Publication Data
US 2020/0041426 A1 Feb. 6, 2020

Related U.S. Application Data

(60) Provisional application No. 62/712,866, filed on Jul. 31, 2018.

(51) Int. Cl.
*G01N 23/201* (2018.01)
*G01N 23/18* (2018.01)

(52) U.S. Cl.
CPC .......... *G01N 23/201* (2013.01); *G01N 23/18* (2013.01); *G01N 2223/611* (2013.01); *G01N 2223/6113* (2013.01); *G01N 2223/6116* (2013.01)

(58) Field of Classification Search
CPC ............. G01N 23/18; G01N 23/201; G01N 2223/611; G01N 2223/6113; G01N 2223/6116
(Continued)

(56) References Cited

U.S. PATENT DOCUMENTS 6,122,344 A * 9/2000 Beevor ............... G01V 5/0025
378/88
6,330,301 B1 * 12/2001 Jiang ................... G01N 23/201
378/85

(Continued)

OTHER PUBLICATIONS

International Search Report and Written Opinion dated Nov. 25, 2019, issued in PCT Application No. PCT/US2019/044216.

*Primary Examiner* — Allen C. Ho
(74) *Attorney, Agent, or Firm* — Weaver Austin Villeneuve & Sampson LLP

(57) ABSTRACT

Provided herein are methods and apparatus for characterizing high aspect ratio (HAR) structures of fabricated or partially fabricated semiconductor devices. The methods involve using small angle X-ray scattering (SAXS) to determine average parameters of an array of HAR structures. In some implementations, SAXS is used to analyze symmetry of HAR structures in a sample and may be referred to as tilted structural symmetry analysis-SAXS (TSSA-SAXS) or TSSA. Analysis of parameters such as tilt, sidewall angle, bowing, and the presence of multiple tilts in HAR structures may be performed.

13 Claims, 29 Drawing Sheets
(26 of 29 Drawing Sheet(s) Filed in Color)

(58) Field of Classification Search
USPC .................................................. 378/86–90
See application file for complete search history.

(56) References Cited

U.S. PATENT DOCUMENTS

| | | | | |
|---|---|---|---|---|
| 6,442,233 B1* | 8/2002 | Grodzins | ............. | G01V 5/0025 378/57 |
| 6,483,891 B1* | 11/2002 | Lazarev | ............... | A61B 6/0435 378/37 |
| 6,621,888 B2* | 9/2003 | Grodzins | ............. | G01V 5/0025 378/57 |
| 6,693,988 B2* | 2/2004 | Harding | ............... | G01V 5/0025 378/86 |
| 6,744,845 B2* | 6/2004 | Harding | ................. | A61B 6/032 378/16 |
| 6,937,695 B2* | 8/2005 | Hoshino | .............. | G01N 23/201 378/86 |
| 6,956,928 B2* | 10/2005 | He | ........................ | G01N 23/201 378/87 |
| 6,993,113 B2* | 1/2006 | Hoshino | .............. | G01N 23/207 378/86 |
| 7,035,375 B2* | 4/2006 | Yokhin | ................. | G01N 23/201 378/86 |
| 7,076,024 B2* | 7/2006 | Yokhin | ................. | G01N 23/201 378/70 |
| 7,092,485 B2* | 8/2006 | Kravis | ................... | G01N 23/20 378/57 |
| 7,120,228 B2* | 10/2006 | Yokhin | ............ | G01N 23/20008 378/90 |
| 7,139,366 B1* | 11/2006 | Jiang | ........................ | G21K 1/04 378/88 |
| 7,400,705 B2* | 7/2008 | Hoshino | .............. | G01N 23/201 378/86 |
| 7,474,728 B2* | 1/2009 | Schlomka | ............... | A61B 6/032 378/6 |
| 7,474,732 B2* | 1/2009 | Berman | ............... | G01N 23/201 378/70 |
| 7,529,341 B2* | 5/2009 | Schlomka | ............... | G01V 5/0025 378/57 |
| 7,551,709 B2* | 6/2009 | Schlomka | ............... | A61B 6/032 378/57 |
| 7,580,499 B2* | 8/2009 | Van Stevendaal | .... | G06T 11/006 378/19 |
| 7,583,783 B2* | 9/2009 | Harding | ............... | G01N 23/046 378/4 |
| 7,587,021 B2* | 9/2009 | Schlomka | ............... | A61B 6/032 378/6 |
| 7,609,812 B2* | 10/2009 | Terada | ................. | G01N 23/203 378/70 |
| 7,623,616 B2* | 11/2009 | Ziegler | ................. | A61B 6/032 378/5 |
| 7,646,849 B2* | 1/2010 | Iwasaki | ................. | G01N 23/207 378/86 |
| 7,702,073 B2* | 4/2010 | Harding | ................. | G21K 1/025 378/86 |
| 7,920,676 B2* | 4/2011 | Yun | ..................... | G03F 7/70625 378/86 |
| 8,243,880 B2* | 8/2012 | Ishibashi | ............... | G01B 15/04 378/89 |
| 9,014,335 B2* | 4/2015 | Jiang | ..................... | G01N 23/207 378/87 |
| 9,031,203 B2* | 5/2015 | Jiang | ..................... | G21K 1/067 378/148 |
| 9,121,812 B2* | 9/2015 | Panine | ................. | G01N 23/201 |
| 9,279,774 B2* | 3/2016 | Romanovsky | ..... | G01N 21/9501 |
| 9,279,776 B2* | 3/2016 | Kleine | ............. | G01N 23/20008 |
| 9,494,535 B2* | 11/2016 | Sezginer | ............. | G01N 23/201 |
| 9,562,865 B2* | 2/2017 | Schnablegger | ....... | G01N 23/202 |
| 9,606,073 B2* | 3/2017 | Mazor | ................. | G01N 23/207 |
| 9,778,213 B2* | 10/2017 | Bakeman | ............. | G01N 23/223 |
| 9,846,132 B2* | 12/2017 | Bakeman | ............. | G01N 23/207 |
| 9,847,242 B2* | 12/2017 | Wu | ........................ | H01L 21/68 |
| 9,958,404 B2* | 5/2018 | Pedersen | ............. | G01N 23/207 |
| 10,145,808 B2* | 12/2018 | Omote | ................. | G01N 23/201 |
| 10,261,212 B2* | 4/2019 | Schafer | ................. | G01V 5/0066 |
| 10,352,695 B2* | 7/2019 | Dziura | ......... | G01N 23/2055 |
| 10,359,377 B2* | 7/2019 | Bykanov | .................. | G21K 1/04 |
| 10,481,111 B2* | 11/2019 | Hench | .................. | G01N 23/201 |
| 10,545,104 B2* | 1/2020 | Hench | .................. | G03F 7/70633 |
| 10,684,238 B2* | 6/2020 | Krokhmal | ............ | G01N 23/201 |
| 10,727,142 B2* | 7/2020 | Gellineau | ........ | G01N 23/20083 |
| 10,748,736 B2* | 8/2020 | Zalubovsky | ......... | G01N 23/201 |
| 10,767,978 B2* | 9/2020 | Shchegrov | .......... | G03F 7/70616 |
| 10,775,323 B2* | 9/2020 | Gellineau | ............. | G01N 23/205 |
| 10,801,975 B2* | 10/2020 | Bakeman | ............. | G01N 23/201 |
| 10,816,486 B2* | 10/2020 | Artemiev | ............. | G01N 23/207 |
| 10,816,487 B2* | 10/2020 | Matney | ................. | G01N 23/207 |
| 10,859,518 B2* | 12/2020 | Artemiev | ............. | G01N 23/201 |
| 10,959,318 B2* | 3/2021 | Khodykin | ............. | H05G 2/005 |
| 10,976,270 B2* | 4/2021 | Wormington | ........ | G01N 23/201 |
| 10,976,272 B2* | 4/2021 | Taniguchi | ............ | G01N 23/207 |
| 10,983,073 B2* | 4/2021 | Ogata | ............. | G01N 23/20025 |
| 10,983,227 B2* | 4/2021 | Hench | .................. | G01N 23/201 |
| 2013/0016346 A1 | 1/2013 | Romanovsky et al. | | |
| 2015/0369759 A1 | 12/2015 | Mazor et al. | | |
| 2017/0199136 A1 | 7/2017 | Krokhmal et al. | | |
| 2018/0106735 A1 | 4/2018 | Gellineau et al. | | |
| 2018/0113084 A1 | 4/2018 | Hench et al. | | |

* cited by examiner $$\text{GOS} = \sum_{i=1}^{n} (\text{Intensity Left}_i - \text{Intensity Right}_i)^2$$

Tilt vector components measured from the GOS plot in Figure 8A

Total resulting tilt vector

DETERMINING TILT ANGLE IN PATTERNED ARRAYS OF HIGH ASPECT-RATIO STRUCTURES BY SMALL-ANGLE X-RAY SCATTERING

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

High aspect ratio (HAR) structures are increasingly incorporated into logic and memory devices such as three-dimensional (3-D) NAND structures and other 3-D structures. During fabrication of such devices, various processes are performed including deposition and etch of material, lithography to define patterns, chemical-mechanical planarization, etc. Metrology techniques may be used to characterize parameters of HAR structures at various stages of fabrication. However, these techniques are time-consuming and have other drawbacks. To determine the tilt of a HAR structure, for example, cross-sectional scanning electron microscopy (SEM) imaging may be done. However, such imaging involves cumbersome, destructive, and time consuming sample preparation.

SUMMARY

Provided herein are methods and apparatus for characterizing structures, including high aspect ratio (HAR) structures, of fabricated or partially fabricated semiconductor devices. The methods involve using small angle X-ray scattering (SAXS) to determine average parameters of an array of structures. In some implementations, SAXS is used to analyze symmetry of structures in a sample and may be referred to as tilted structural symmetry analysis SAXS (TSSA-SAXS) or tilted structural symmetry analysis (TSSA). Analysis of parameters such as tilt, sidewall angle, bowing, and the presence of multiple tilts in structures may be performed.

One aspect of the disclosure relates to a method including: illuminating a sample including an array of structures with x-ray radiation such that the sample scatters the x-ray radiation; rotating the sample through a series of angular positions around a first measurement axis; at each angular position, detecting a pattern of intensity of the scattered radiation; and determining, based on the symmetry of the patterns of intensity, an average tilt of the structures in a first plane. In some embodiments, average tilt is determined without reference to a model. In some embodiments, the magnitude and direction of the average tilt is determined.

In some embodiments, the method further includes: rotating the sample through a series of angular positions around a second measurement axis; at each angular position, detecting a pattern of intensity of the scattered radiation; and determining, based on the symmetry of the patterns of intensity, an average tilt of the pattern of the structures in a second plane. In some such embodiments, the method further includes determining an average overall tilt from the average tilt in the first plane and the average tilt in the second plane. According to various embodiments, wherein the first and second axes may or may not be orthogonal.

In some embodiments, the method further includes rotating the sample by an angle $\chi$ around an axis orthogonal to the first measurement axis prior to rotating the sample through the series of angular positions.

In some embodiments the operation of determining, based on the symmetry of the patterns of intensity, an average tilt of the pattern of the structures in a first plane involves comparing peak intensities of the right side of a pattern of intensity with those of the left side of the pattern of intensity.

In some embodiments the operation of determining, based on the symmetry of the patterns of intensity, an average tilt of the pattern of the structures in a first plane involves plotting goodness of symmetry (GOS) vs sample angle, wherein GOS is given by:

$$GOS = \sum_{i=1}^{n} (\text{Intensity } Left_i - \text{Intensity } Right_i)^2$$

where there are n peaks.

In some embodiments the operation of determining, based on the symmetry of the patterns of intensity, an average tilt of the pattern of the structures comprises determining the sample angle at which the pattern of intensity is symmetric. In some embodiments, the average tilt is determined to a resolution of at least 0.05°.

Another aspect of the disclosure relates to a method including: illuminating a sample including an array of structures with x-ray radiation such that the sample scatters the x-ray radiation; rotating the sample through a series of angular positions around a first measurement axis; at each angular position, detecting a pattern of intensity of the scattered radiation; and determining, based on the symmetry of the patterns of intensity, if the structures are characterized by one or more of: a tilt, a non-vertical sidewall angle, bowing, or kinking.

Another aspect of the disclosure relates to a method including: illuminating a sample including an array of structures with x-ray radiation such that the sample scatters the x-ray radiation; rotating the sample through a series of angular positions around a first measurement axis; at each angular position, detecting a pattern of intensity of the scattered radiation; and determining, from the detected pattern, if there is any asymmetry in the array of structures.

Yet another aspect of the disclosure relates to apparatus including a sample holder configured to hold a sample; a positioning system connected to the sample holder and configured to rotate the sample along one or more measurement axes; an x-ray source configured to illuminate the sample with x-ray radiation such that the sample scatters radiation; a detector positioned to detect intensity of the scattered radiation; a controller configured to control the operations of the x-ray-source, positioning system, and detector to: i) illuminate the sample such that the sample scatters the x-ray radiation, ii) rotate the sample through a series of angular positions around a first measurement axis, iii) at each angular position, detecting a pattern of intensity of the scattered radiation; and an analysis system configured to determine, based on the symmetry of the patterns of intensity, if the structures are characterized by one or more of: a tilt, a non-vertical sidewall angle, bowing, or kinking.

Also provided are apparatuses for implementing the methods described herein. These and other features are described further below with references to the Figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
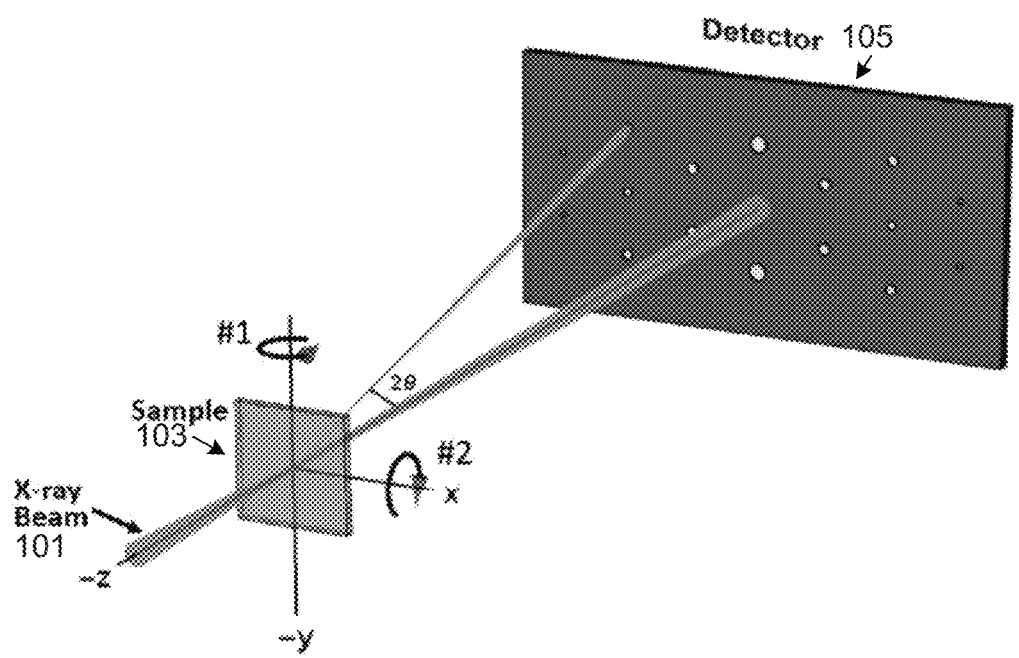
FIG. 1 is an example of a measurement configuration that may be used in the TSSA techniques described herein.
Figure 2:
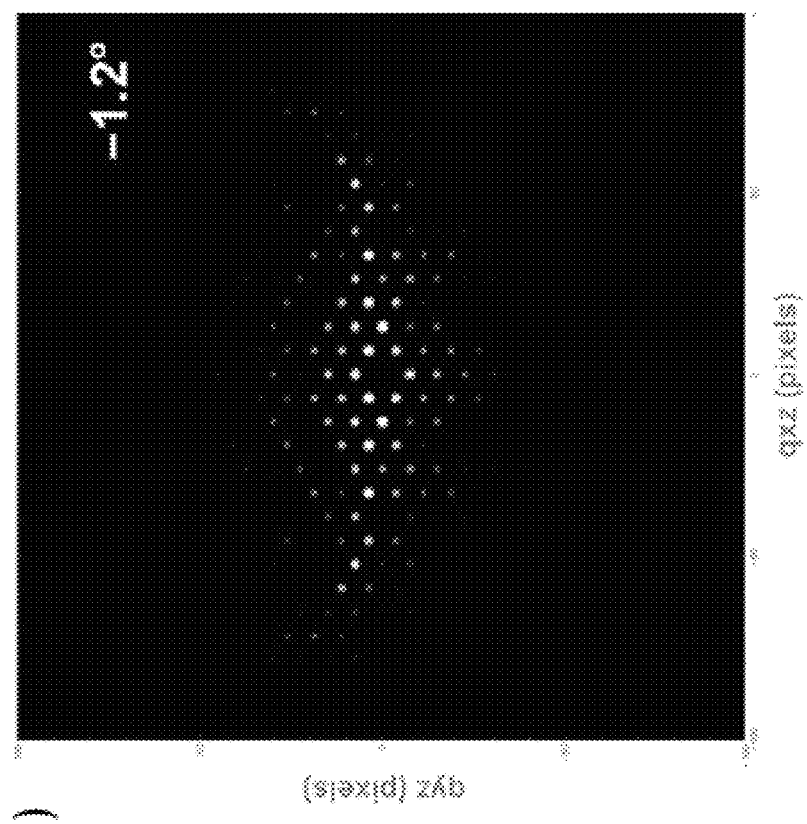
FIG. 2 shows simulated examples of scattering patterns that can generated by the TSSA techniques described herein.
Figure 2:
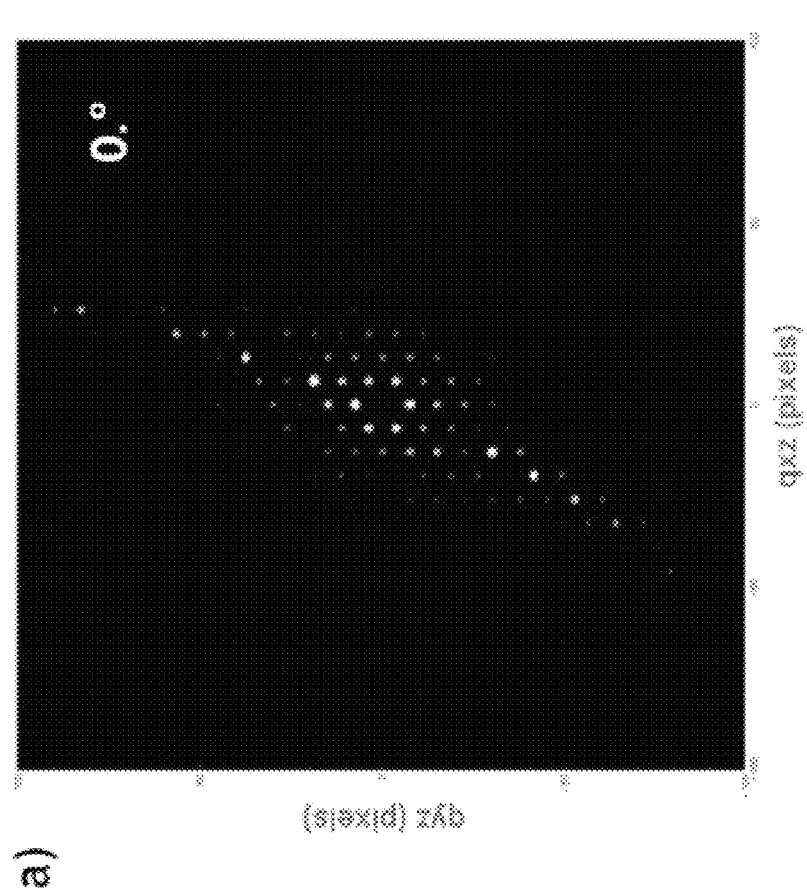

Provided herein are methods and apparatus for characterizing high aspect ratio (HAR) structures of fabricated or partially fabricated semiconductor devices. The methods involve using small angle X-ray scattering (SAXS) to determine average parameters of an array of HAR structures. In some implementations, SAXS is used to analyze symmetry of HAR structures in a sample and may be referred to as tilted structural symmetry analysis-SAXS (TSSA-SAXS) or TSSA. Analysis of parameters such as tilt, sidewall angle, bowing, and the presence of multiple tilts in HAR structures may be performed. FIGS. 1 and 2 provide a brief overview of the technique, with further details discussed below with reference to FIGS. 3A-15.

FIG. 1 is an example of a measurement configuration that may be used in the TSSA techniques described herein. An X-ray beam 101 is passed through a target pattern on a sample substrate 103. The resulting scattering pattern is detected by a detector 105, downstream of the sample substrate 103. Intensity values of scattering peaks that are divergent from the main X-ray beam 101 are recorded for subsequent analysis. As the sample substrate 103 is rotated about the measurement rotation axis (the y-axis in FIG. 1, labeled #1), the scattering pattern changes and provides information regarding the tilt of the structures in the patterned array. With an understanding of the scattering patterns that result from tilted HAR structures, the average tilt of the structures can be determined. When the target pattern is at normal incidence to the X-ray beam 101, the resulting scattering pattern immediately indicates if the structures are tilted and the direction of the tilt.

When the sample substrate 103 is rotated about #1, the scattering pattern changes to reflect an increase or decrease of the component of tilt in the structures that is in the x-z plane. The sample substrate 103 is rotated about #1 until the scattering pattern is symmetric about the measurement rotation axis, signifying that the X-ray beam 101 is aligned with the component of tilt in the structures that is in the x-z plane. The amount by which the sample substrate 103 is rotated is equal and opposite to the component of the HAR structure tilt in the x-z plane. As discussed further below, in some embodiments, the sample substrate 103 may be offset from the x-y plane by a small angle to provide a rotation offset enhancement (ROE) prior to rotating it about the measurement axis. The ROE increases sensitivity of the measurement.

Simulated examples of scattering patterns generated by the technique are given in FIG. 2 where image a) shows a normal incidence scattering pattern for a sample substrate 103 having tilted HAR structures and b) shows that the scattering pattern has become symmetric about the vertical axis when the sample is rotated using axis #1 to $-1.2°$, signifying that the component of tilt in the structures in the x-z plane is 1.2°. The component of tilt in the y-z plane can be determined either by rotating the sample 90 degrees about the sample surface normal (the z-axis in FIG. 1) and repeating the measurement with rotation axis #1 or repeating the measurement using an additional axis (the x-axis in FIG. 1).

The TSSA technique may be implemented to realize one or more advantages. Unlike imaging techniques, it may be performed quickly and without extensive or destructive sample preparation. Moreover, it does not require modelling or prior information on the structure being observed. This is unlike critical dimension SAXS (CDSAXS), a technique that involves fitting measured scattered intensities to modelled scattered intensities of presumed structures. Because measured scattered intensities are sensitive to minute details in a HAR structure, generating good models greatly benefits from having prior information on the structures being measured. The TSSA techniques described herein do not require prior information on the samples. Another advantage that may be realized by implementations described herein is using low resolution and noisy scattering patterns to characterize structures. This is also unlike CDSAXS, in which high resolution and low noise are required to obtain individual peak intensities to fit to models. The signal to noise ratios and resolutions required for fitting to models would require measurement times that may be as longs as hours for sample target sizes of interest. Certain implementations of TSSA may use high flux and small spot size with a resulting increase in x-ray beam divergence for fast (on the order of tens of seconds) measurements. Another advantage that may be realized by implementations described herein is that because the technique can use low resolution scattering patterns, it can be used for measurement of samples having a larger pitch. Yet another advantage that may be realized is that an x-ray beam spot size may be focused at a sample to a small spot size with large divergence and reduced resolution in the scattering pattern, allowing for measurement of small or densely packed sample targets without losing flux. A further advantage that may be realized by implementations described herein is that post-measurement analysis is fast and does not require the significant time for data reduction and modelling of CDSAXS. According to various implementations, the tilt may be determined with a resolution of 0.05 degrees or greater. As such, the technique may be used for tilt determination for current and future nodes in the semiconductor industry.

Figure 3A:
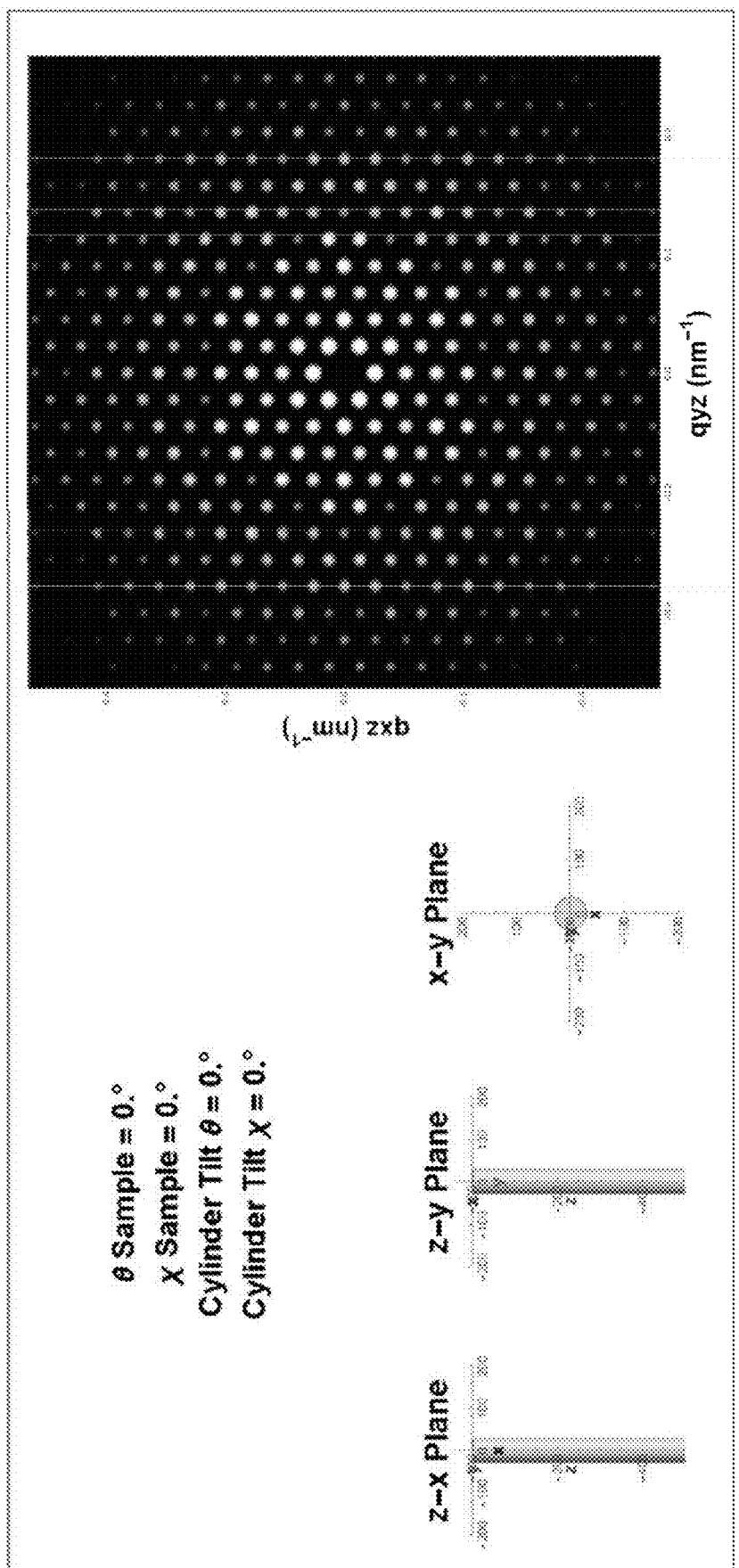
FIGS. 3A-3G provide examples of simulated scattering patterns of a normal incidence X-ray beam on a hexagonal array of cylindrical holes having a critical dimension (CD) of 60 nm and a height of 2400 nm (AR of 40).
Figure 3B:
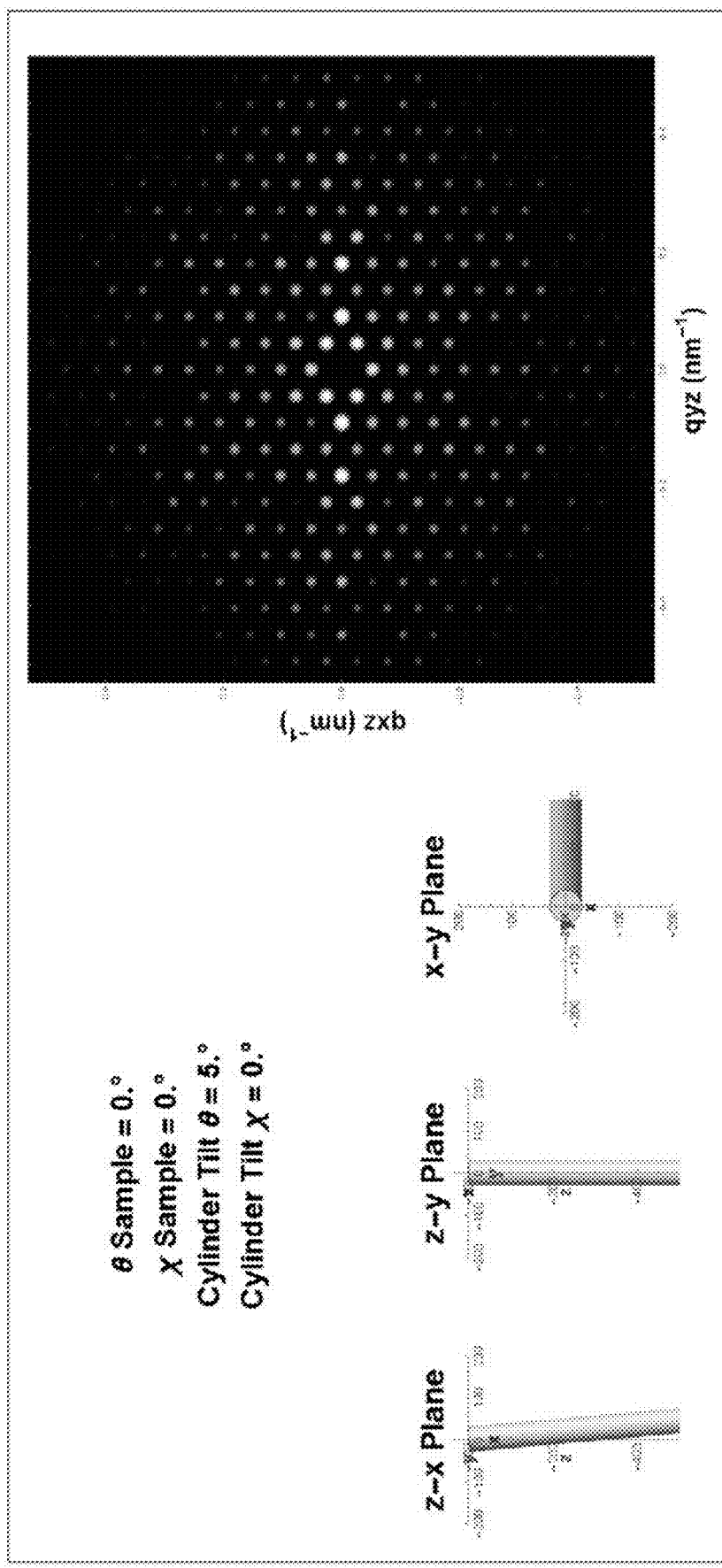
Figure 3C:
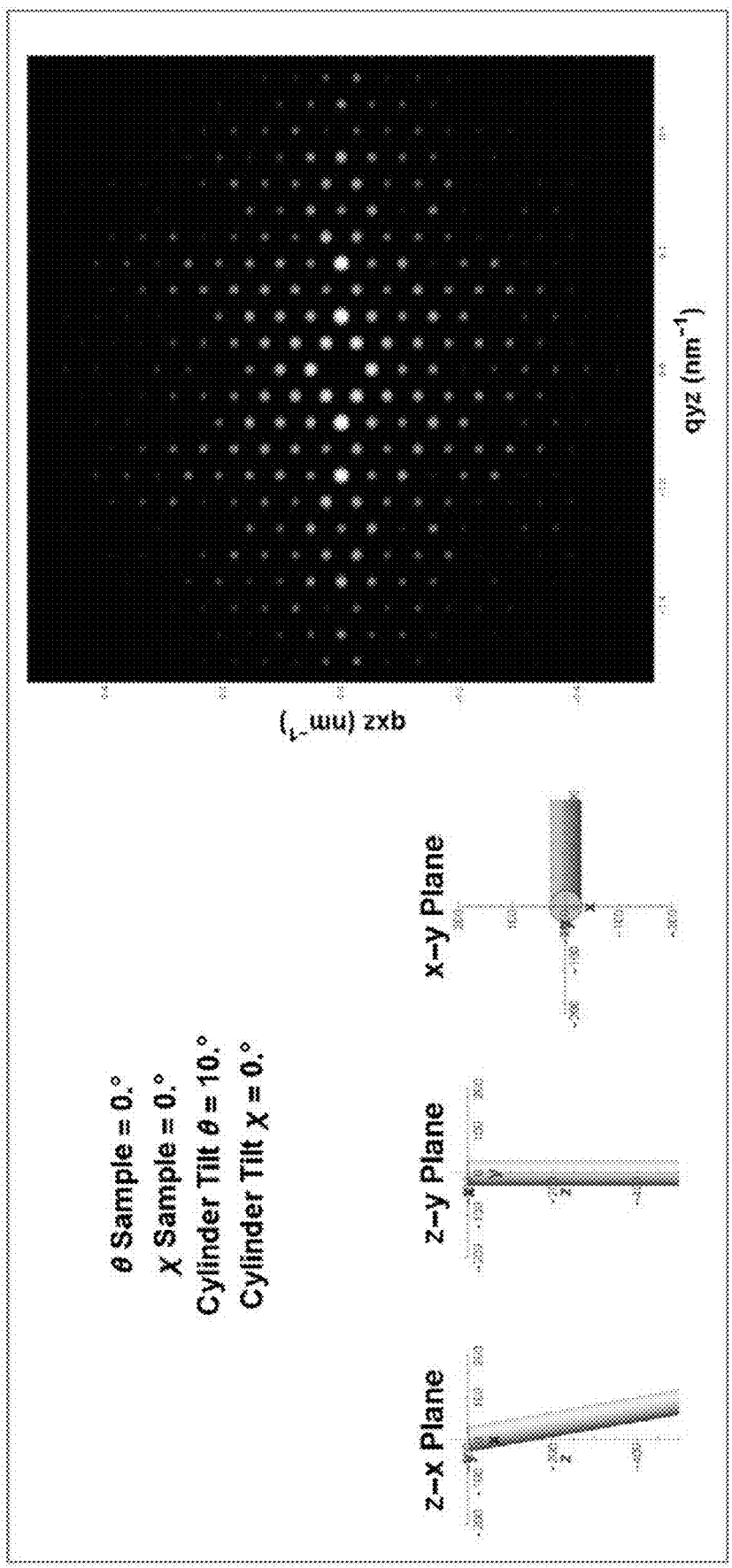
Figure 3D:
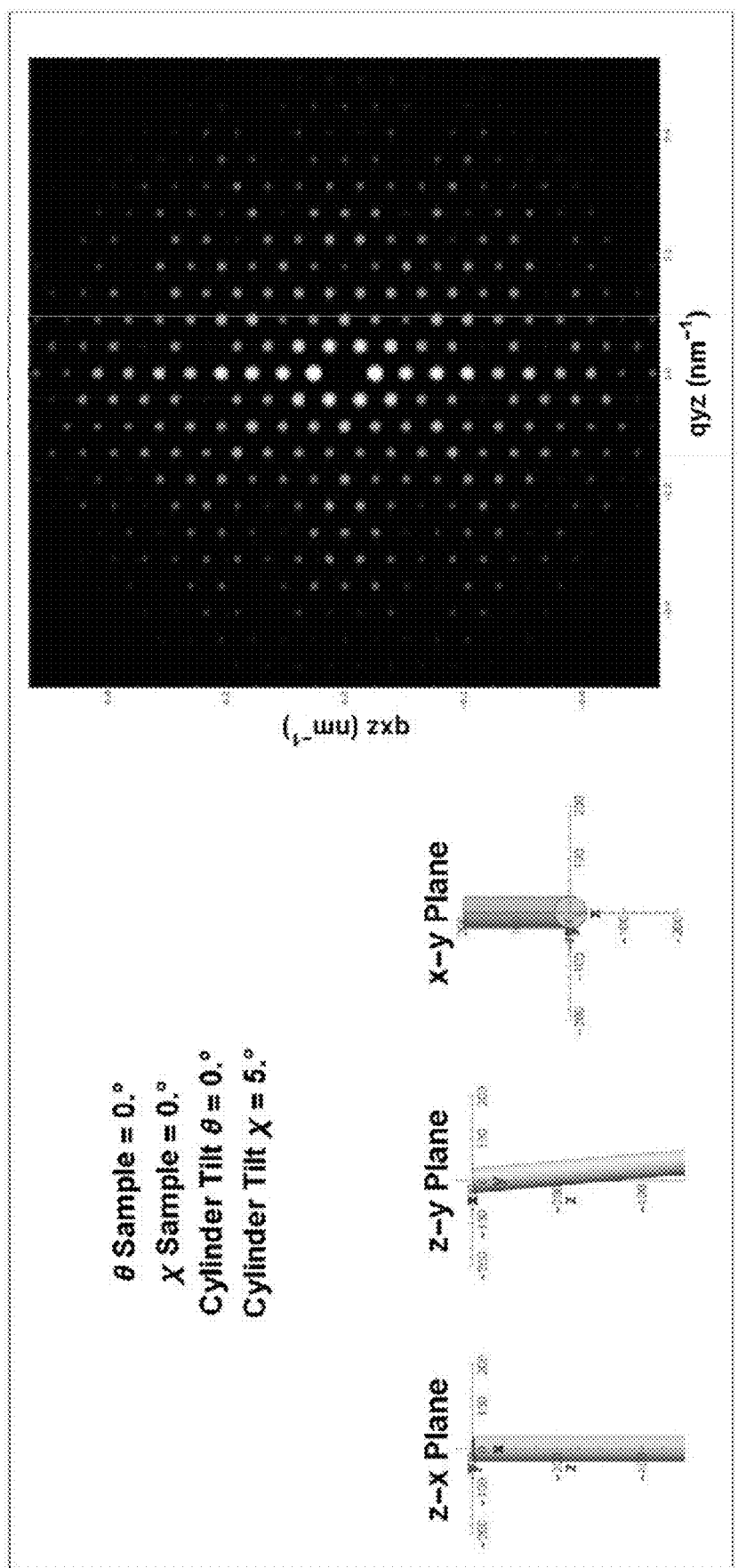
Figure 3E:
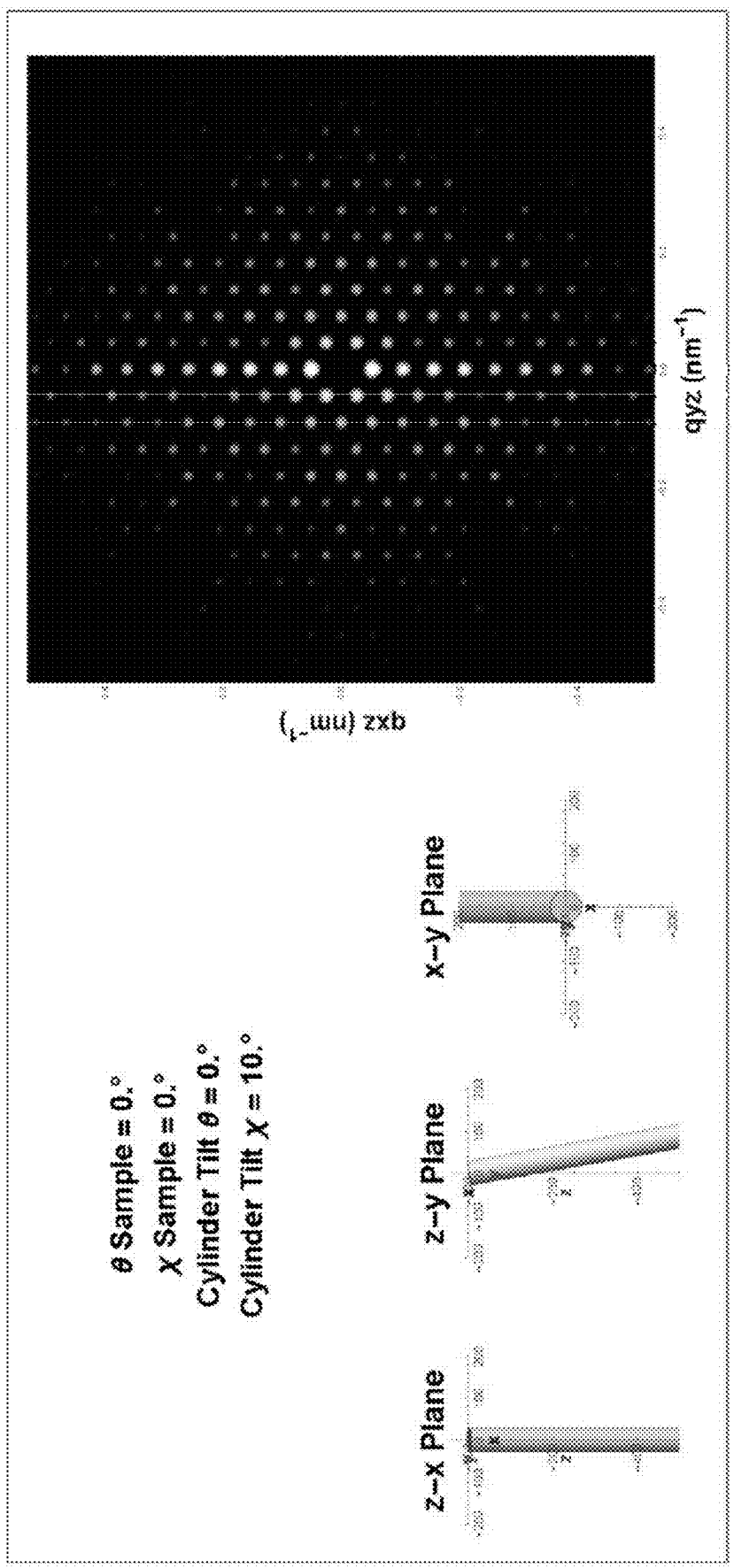
Figure 3F:
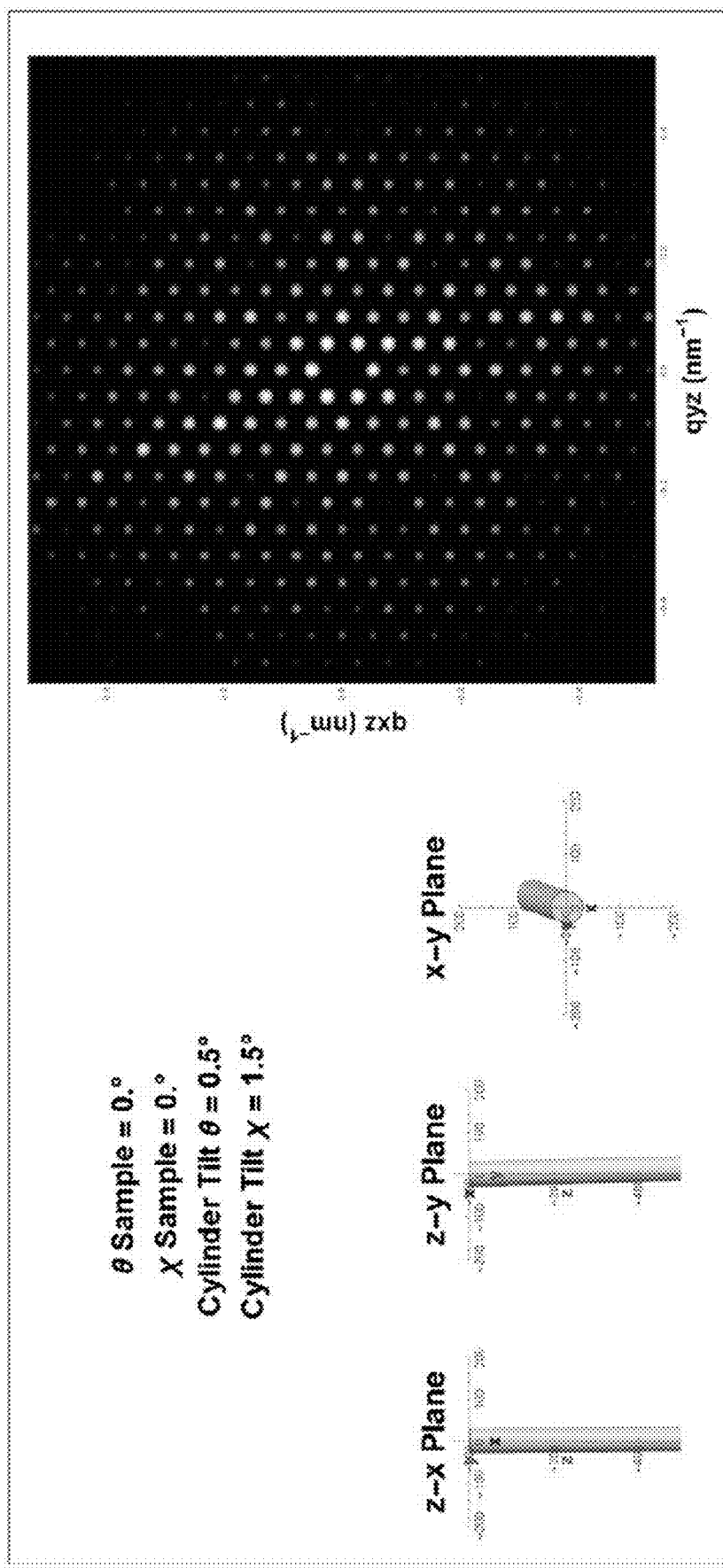
Figure 3G:
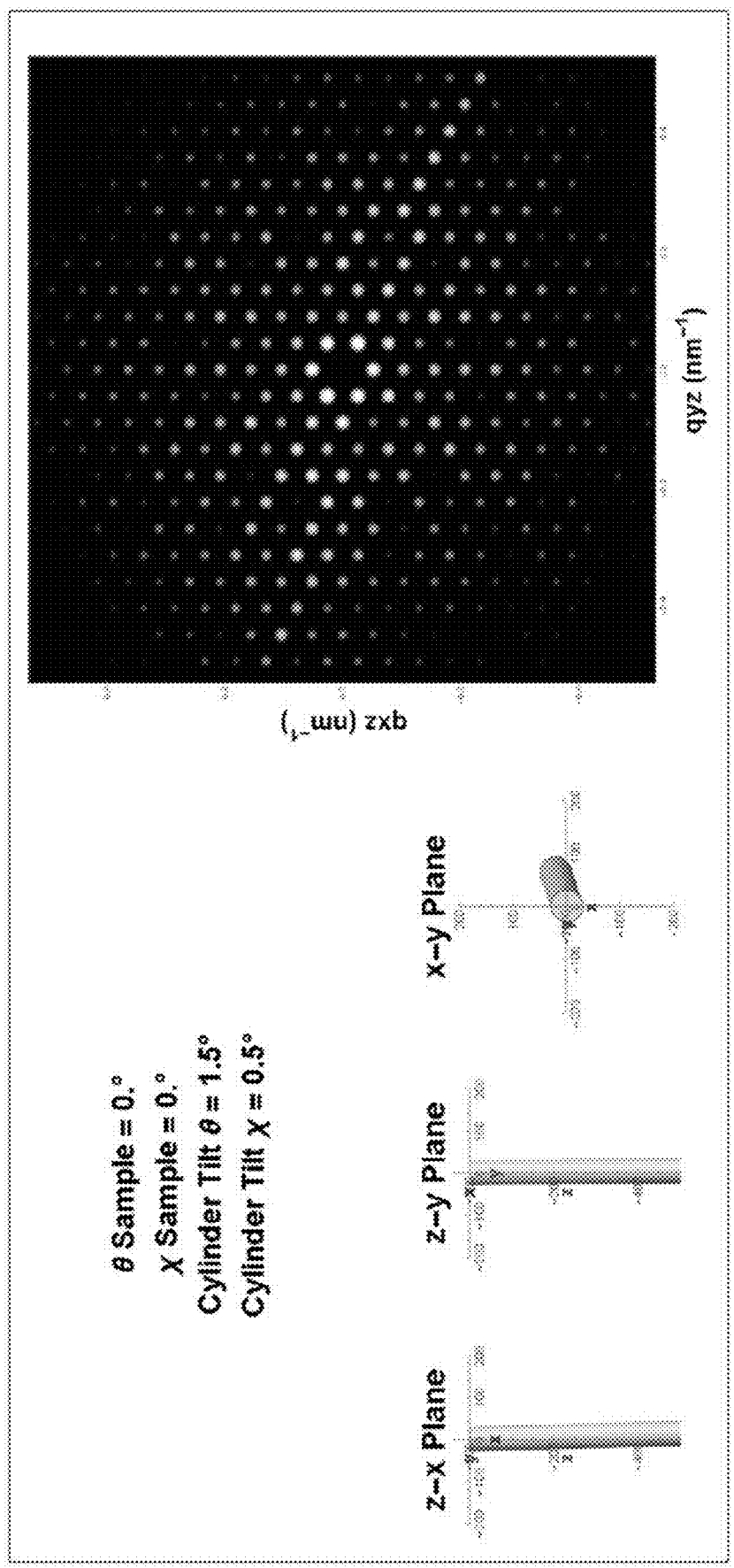

FIGS. 3A-3G provide examples of simulated scattering patterns of a normal incidence X-ray beam on a hexagonal array of cylindrical holes having a critical dimension (CD) of 60 nm and a height of 2400 nm (AR of 40). First, in FIG. 3A, scattering by an array of cylindrical holes without tilt was simulated. The resulting scattering pattern is perfectly symmetric. FIGS. 3B and 3C show results of simulations with cylinder tilt in the z-x plane ($\theta$); FIG. 3B with a 5° tilt and FIG. 3C with a 10° tilt. See FIG. 1 for representative plane axes. Comparing the simulated scattering patterns in FIG. 3B with that in FIG. 3A, it can be seen that the tilt in the structures results in an asymmetric scattering pattern that is thinner along the horizontal axis than along the vertical axis. Comparing FIG. 3C with FIG. 3B, it can be seen that the asymmetry increases as the tilt increases. The direction of the asymmetry remains the same, but the intensity fall-off in one direction is greater, leading to a thinner and easier to detect intensity region. FIGS. 3D and 3E show results of simulations with cylinder tilt in the z-y plane ($\chi$); FIG. 3D with a 5° tilt and FIG. 3E with a 10° tilt. Comparing these scattering patterns to those in FIGS. 3B and 3C, the thinning is shifted 90° and is along the vertical axis. Finally, FIGS. 3F and 3G show results of cylinder tilt in the z-x plane ($\theta$) and z-y plane ($\chi$); FIG. 3F with $\theta$ of 0.5° and $\chi$ of 1.5° and FIG. 3G with $\theta$ of 1.5° and $\chi$ of 0.5°. The scattering pattern is thinner in both directions.

Figure 4:
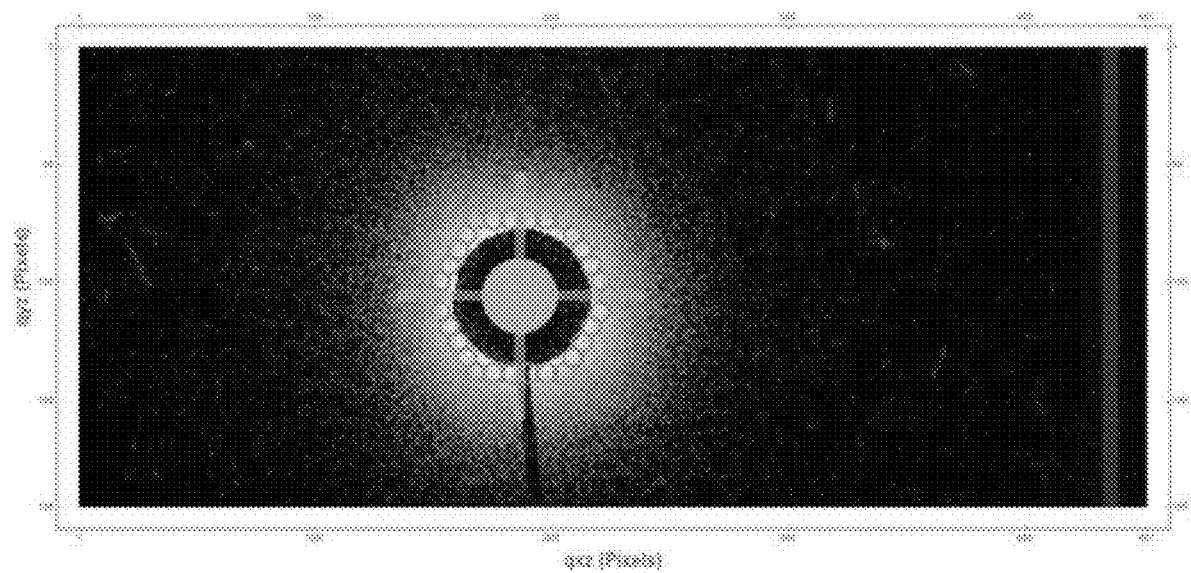
FIG. 4 shows an X-ray scatter plot generated from a normal incidence beam on a target having a pitch of 160 nm.

As described above, in some implementations, low resolution scattering patterns may be generated to determine tilt. An example is shown in FIG. 4, which shows an X-ray scattering pattern generated from a normal incidence beam on a target having a pitch of 160 nm. The large pitch results in scattering peaks which are too close together to resolve. The scattering pattern in FIG. 4 would not be usable for CDSAXS. However, although individual peaks cannot be resolved, the symmetry or asymmetry of the pattern is possible to detect, and in some embodiments can quantitatively determine the tilt.

Figure 5:
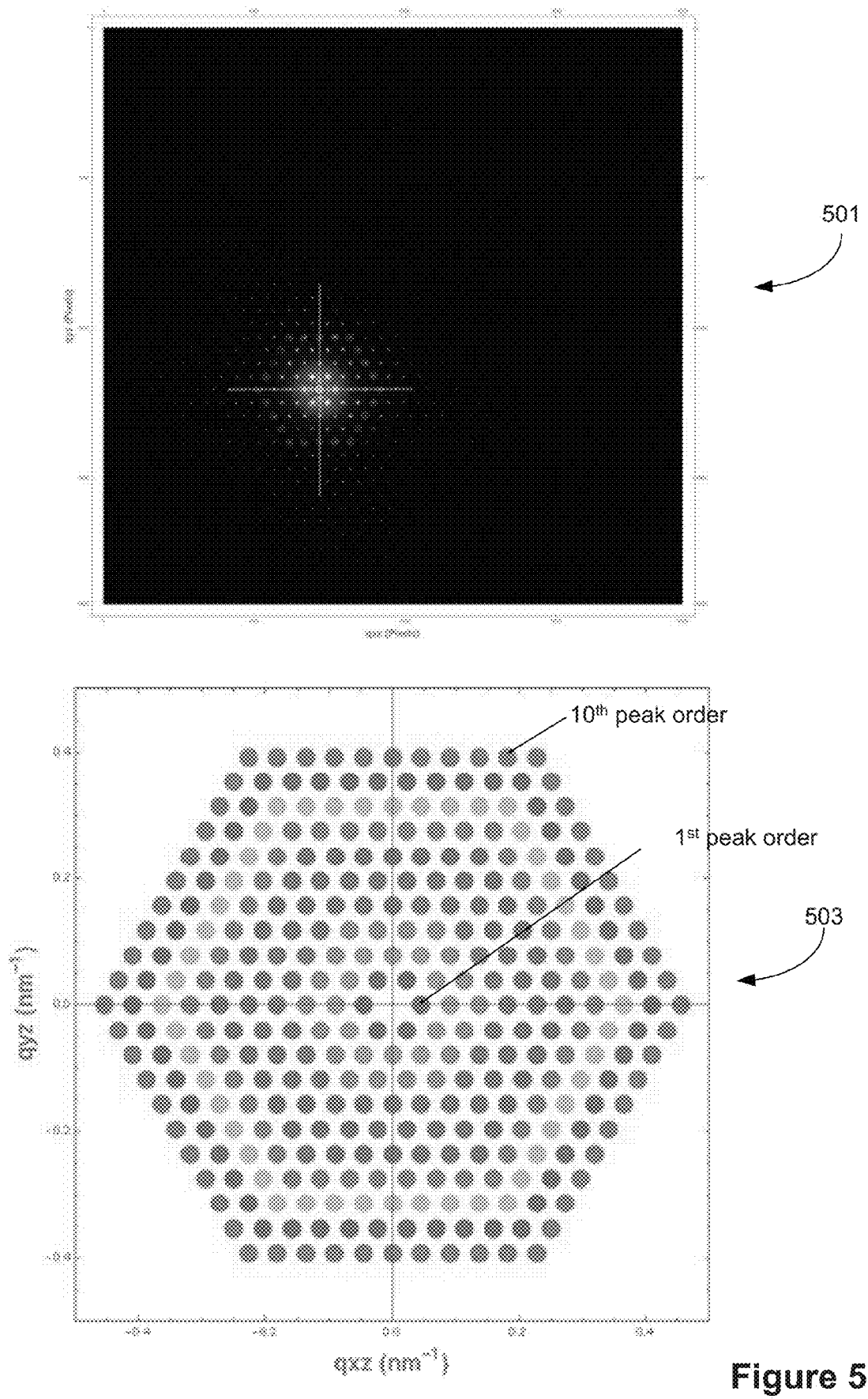
FIGS. 5 and 6 include images that illustrate one method of determining asymmetry in a scattering plot.
Figure 6:
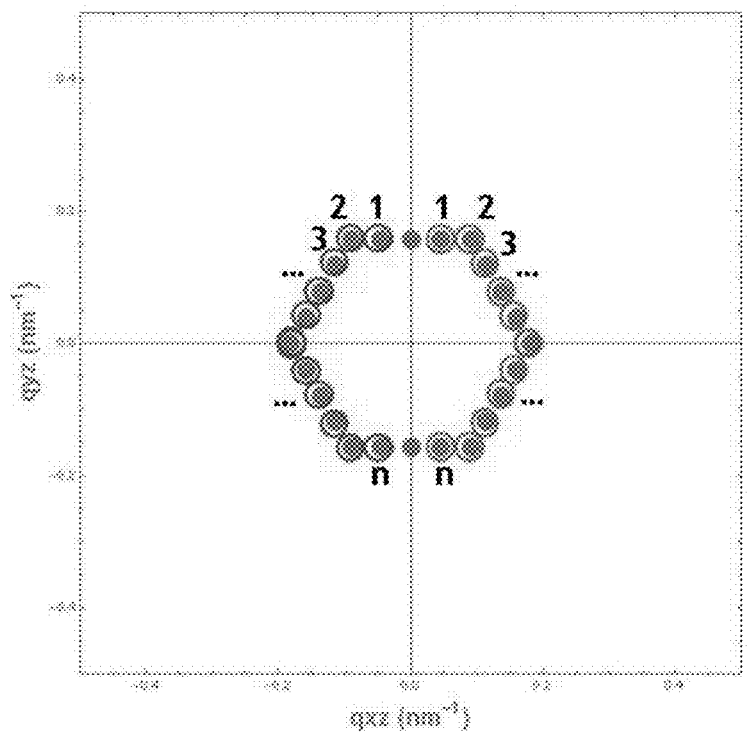

FIGS. 5 and 6 illustrate one method of determining asymmetry in a scattering plot, although one having ordinary skill in the art will understand that other methods may be applied. At 501, a scattering pattern is shown. At 503, a representation of the peaks of the scattering pattern 501 is shown, as a series of concentric hexagons. The peaks of the innermost hexagon are referred to as the first order peaks, and in this example, the outermost are the $10^{th}$ order peaks.

In some embodiments, a goodness of symmetry function (GOS) may be calculated to determine the symmetry of the scattering pattern. In the example of FIG. 6, the (GOS) is calculated for each order as follows:

$$GOS = \sum_{i=1}^{n}(\text{Intensity } Left_i - \text{Intensity } Right_i)^2$$

Figure 7A:
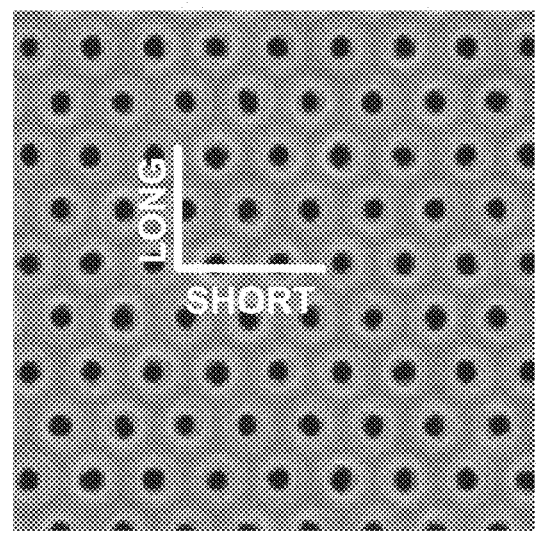
FIG. 7A shows a top down image showing the long and short directions of an example structure of hexagonally arrayed high aspect ratio (HAR) holes, the long direction referring to the direction having the greater distance between holes.
Figure 7B:
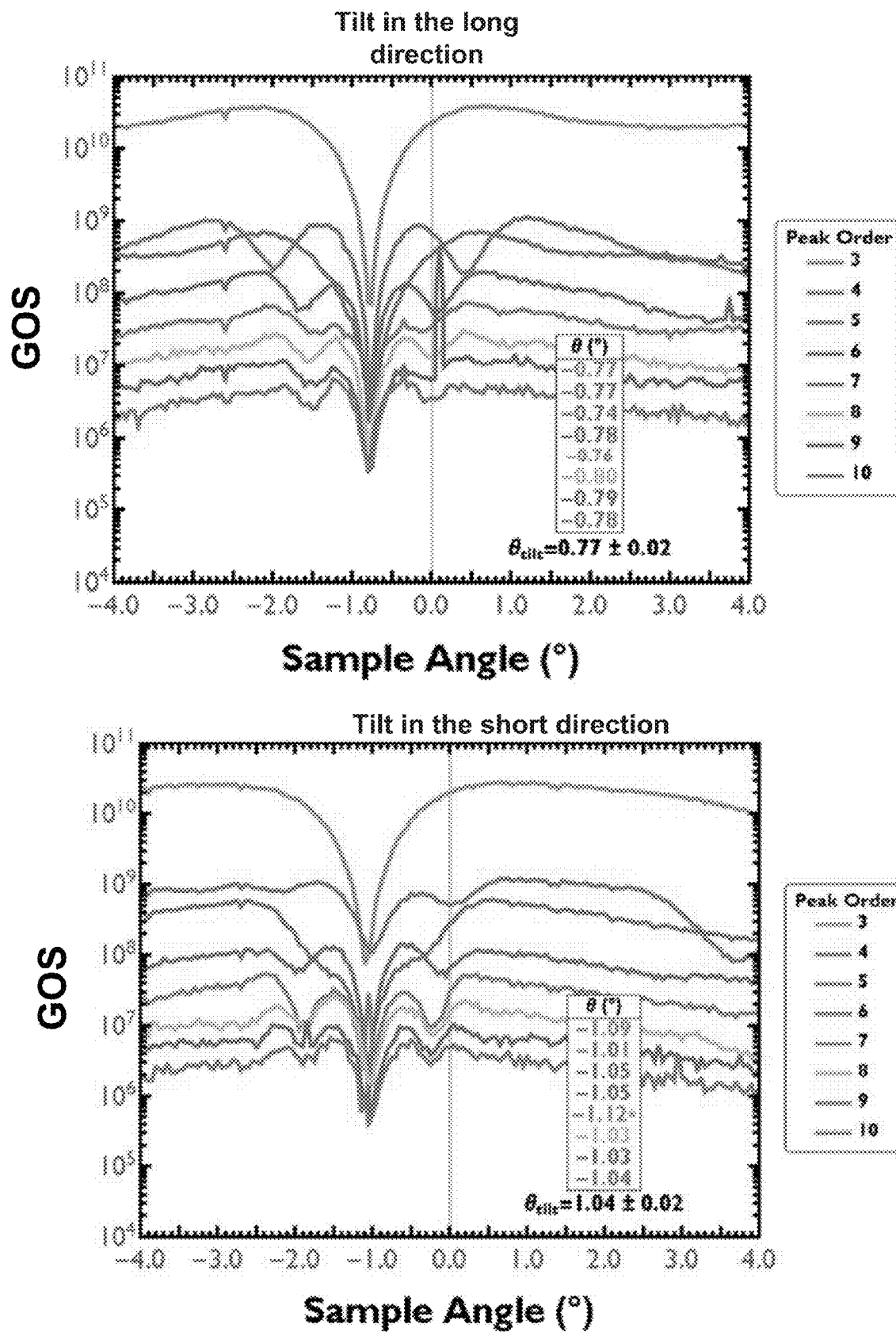
FIG. 7B shows a goodness of symmetry (GOS) vs sample angle plot for each of the long direction and short directions of a structure of HAR holes.

GOS may be plotted as a function of sample angle. FIG. 7A shows a top down image showing the long and short directions of an example structure of high aspect ratio (HAR) holes, the long direction referring to the direction having the greater distance between holes. A GOS vs sample angle plot for each of the long direction and short direction is shown in FIG. 7B. In each case, the position of the central minimum of the plots indicates the tilt the of the HAR holes. The magnitude of the tilt in the long direction is 0.77 and 1.04 in the short direction. The direction of the tilt is opposite the sign of the location of the sample angle minimum. From the two tilt vectors, the overall tilt vector may be determined.

As indicated above, other methods may be applied to determine asymmetry, including defining a grid of squares or left and right quadrants, etc. While one possible goodness of symmetry function is provided above, other possible goodness of symmetry functions may be used as well. Plotting the GOS can give additional information about the shape of the holes in the sample. If the shape of the hole is symmetric, but tilted, each of the peak order curves of the GOS plots will be symmetric about the central minimum. If there are asymmetries in the curves themselves, that may indicate asymmetry within the holes. This is described further below with respect to FIGS. 13A-13D.

If the direction of tilt is known, the method may involve sampling along a single measurement axis. However, if the tilt is an arbitrary or unknown direction, the method involves determining the tilt along two measurement axes to determine the overall tilt. This can involve rotating the sample along a first measurement axis, recording the intensity at each angle, then rotating the sample along a second measurement axis, recording the intensity at each angle. Depending on the number of rotation stages and other equipment employed, the sample may or may not be rotated to align it with the second measurement axis.

In some embodiments, the two measurement axes are orthogonal, but this is not necessarily the case. Other angles may be employed (e.g., 0° and 60°).

Figure 8A:
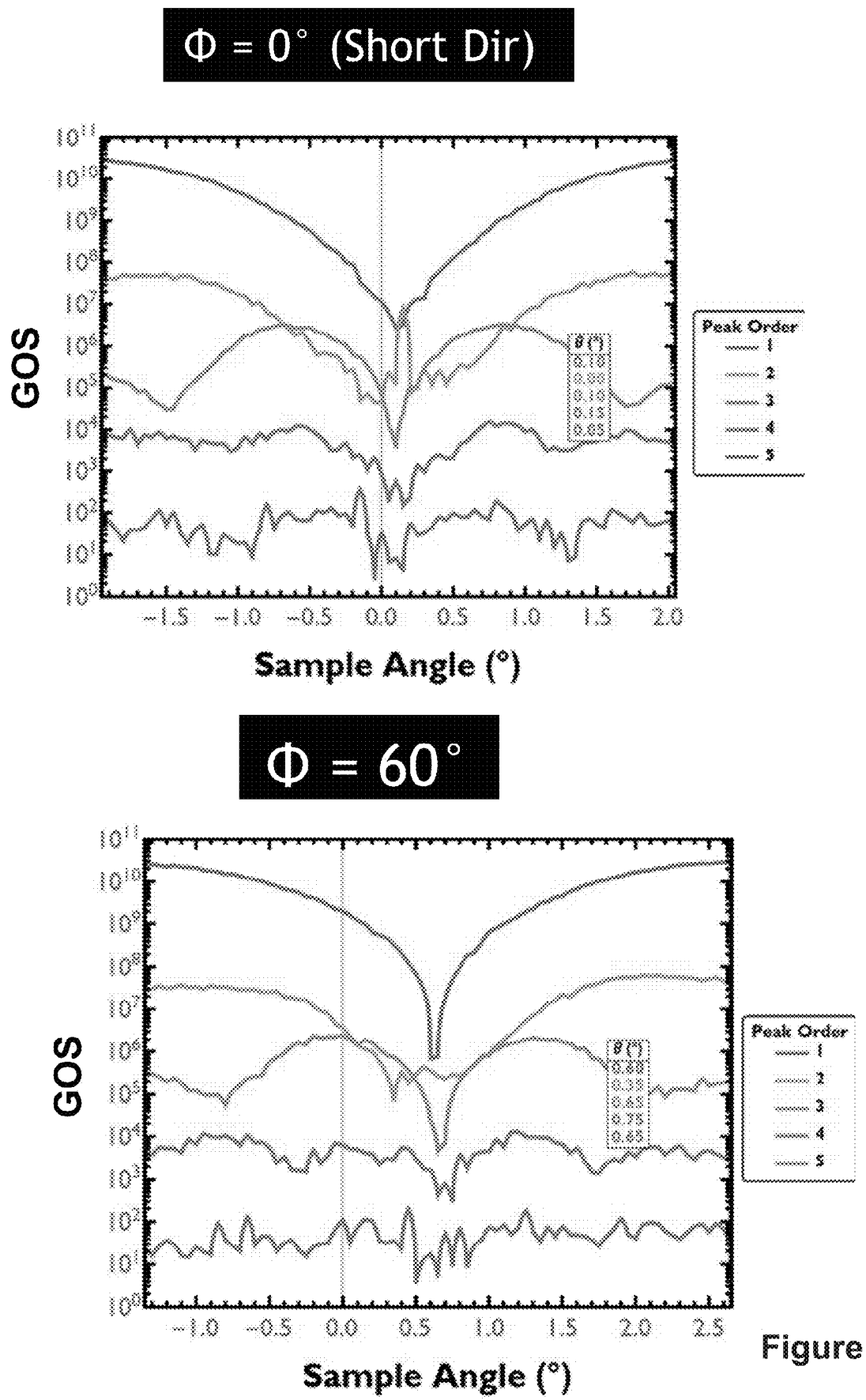
FIG. 8A shows GOS plots for a sample including hexagonally arrayed HAR features, measured at $\phi=0°$ (short direction) and at $\phi=60°$.
Figure 8B:
FIG. 8B illustrates an overall tilt vector derived from tilt vector components determined from the GOS plots in FIG. 8A.
Figure 8B:
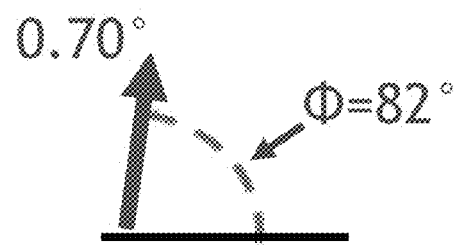

If orthogonal axes are used, they need not be along 0° and 90°. For example, 60° and 150° may be used. The measurement angle may be chosen to provide well-defined intensity minima. If the total intensity is maximized at a particular angle, it can be harder to detect the central minimum. FIG. 8A shows GOS plots for a sample measured at $\phi=0°$ (short direction) and at $\phi=60°$. For the sample, the $1^{st}$ orders of the $\phi=0°$ and $\phi=60°$ scans have a pronounced minimum at alignment. As the tilt measurement is fastest if the lowest peak order can be used, using angles for which lower peak angles are usable can reduce measurement time. In the example of FIG. 8A, the third order peaks have minima at 0.65° and 0.1°, respectively. This results in a tilt vector having a magnitude of 0.7° and a direction of 82° as illustrated in FIG. 8B.

For peaks in a hexagonal arrangement as described with respect to FIG. 7A, the measurement angles may be a multiple of 30° (0, 30°, 60°, 90°, 120°, etc.) for ease of calculation. This is because the symmetry in the peaks of the hexagonal pattern rotates 90° for every 30° rotation of the sample. Other angles may be used if the offset is accounted for, however. Similarly, for a square array of peaks, multiples of 90° may be used.

Figure 9A:
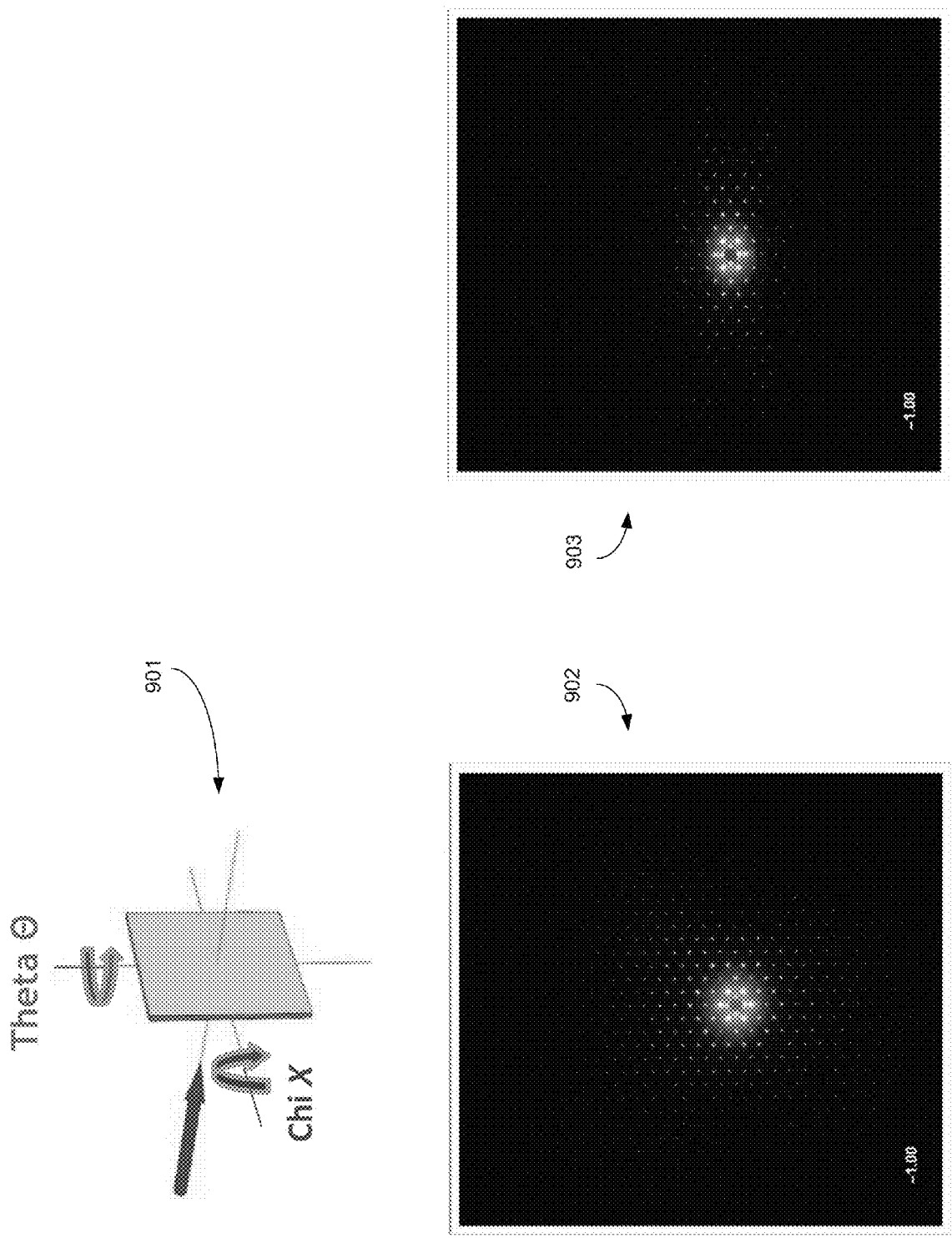
FIG. 9A shows a schematic of an experimental set-up including rotation offset enhancement (ROE) configured for rotation ($\theta$) around a measurement axis and an ROE angle of $\chi$.

In certain embodiments, a rotation offset enhancement (ROE) may be applied. Referring to FIG. 1, a significant component of tilt in the structures in the y-z plane can facilitate identifying symmetry in the scattering pattern and thus the component of tilt in the x-z plane. Accordingly, in some embodiments, this tilt can be induced using a rotation axis that is orthogonal to the measure measurement axis. In the case where axis #1 (referring to FIG. 1) is the measurement axis, the offset is applied to axis #2, and may be referred to a "rotation offset enhancement" or "ROE." FIG. 9A shows a schematic of an experimental set-up at 901, configured for rotation ($\theta$) around a measurement axis and an ROE angle of $\chi$. During measurement, the sample is first rotated about $\chi$ to a fixed ROE angle, where it is held while the sample is rotated around the measurement axis ($\theta$). (To measure the second component of tilt, the sample may be rotated 90° and the process repeated; alternatively, with appropriate equipment, $\theta$ may be used for the ROE angle, with the sample rotated around the other axis ($\chi$).)

Figure 9B:
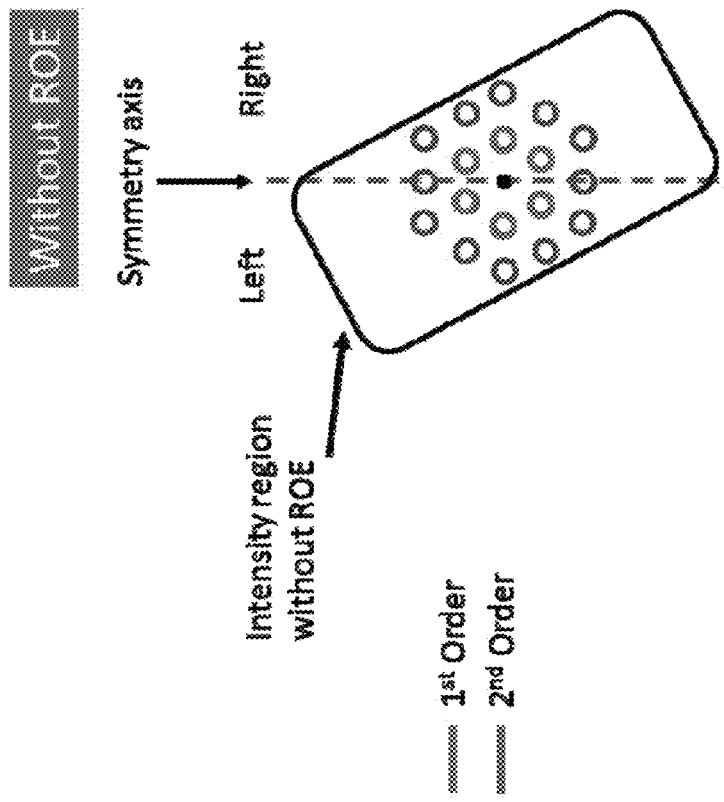
FIG. 9B schematically illustrates example scattering patterns with and without rotation offset enhancement (ROES applied.
Figure 9B:
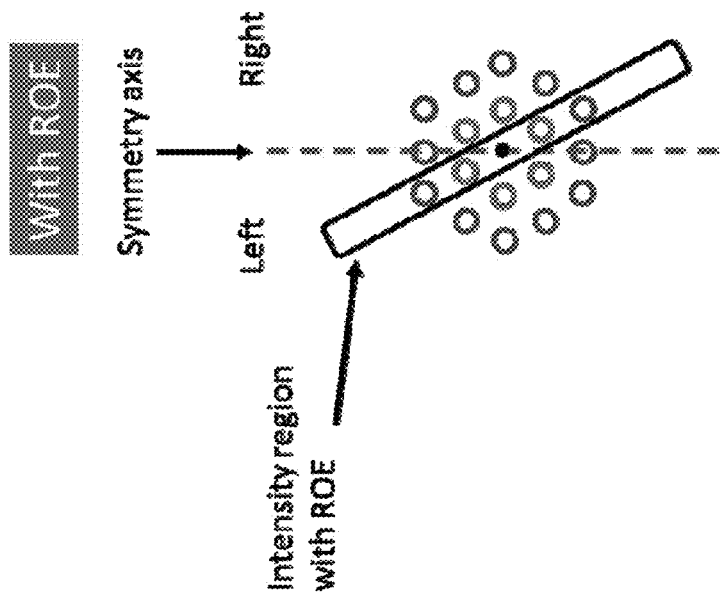
Figure 10:
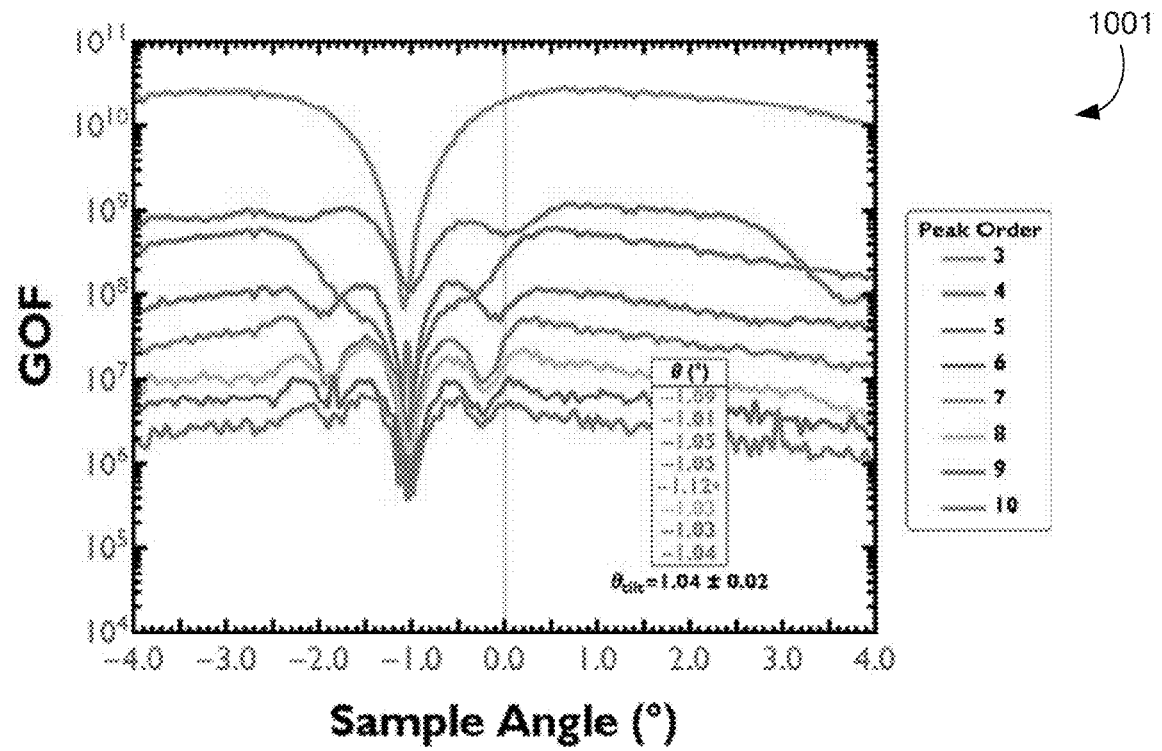
FIG. 10 shows a GOS plot 1001 for a structure measured with no ROE ($\chi=0°$) and a GOS plot for a structure measured with an ROE of $\chi=-3.0°$.
Figure 10:
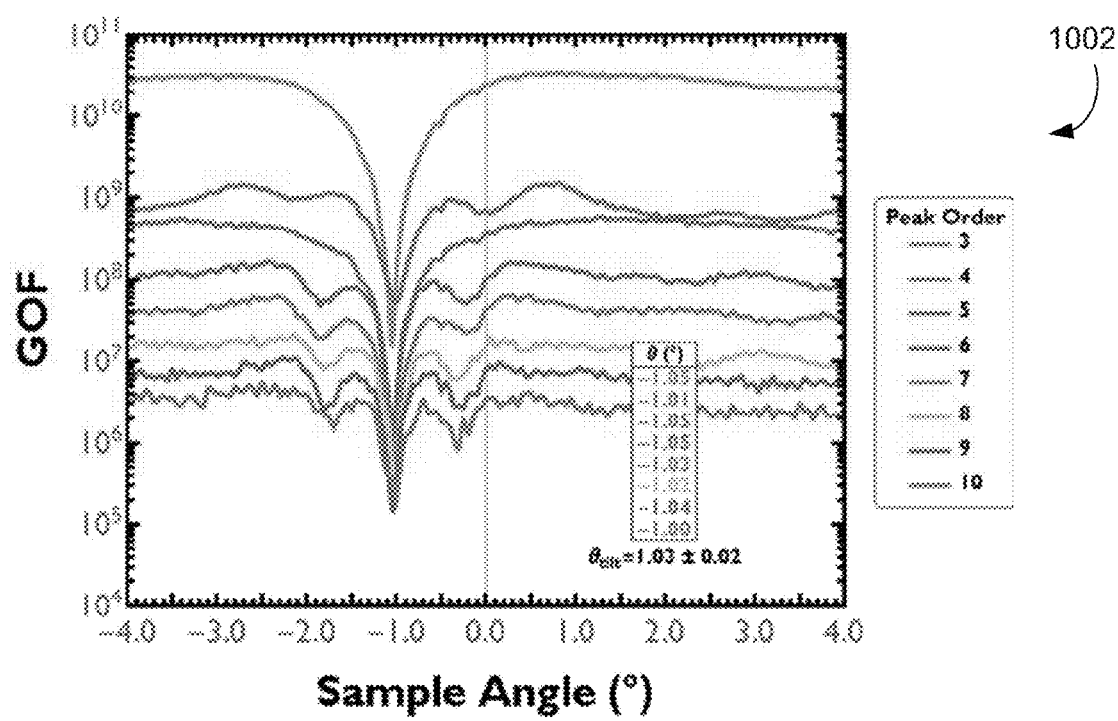

FIG. 9B schematically illustrates example scattering patterns with and without ROE applied, the inner hexagon of peaks being the first order peaks and the outer hexagon being the second order peaks. With ROE, as the sample is rotated, the intensity region rotates such that only the peaks that are in the box 905 are "illuminated." Using a GOS function, for example, for a given order, a single peak on the left will be compared with a single peak on the right, providing more isolated symmetry information. Without ROE, as the sample is rotated, the intensity region rotates but with several peaks on the left compared with several peaks on the right for a given order. The grouping of multiple peaks can significantly blur the information that is extracted; this is especially true for noisy low resolution data.

Figure 11A:
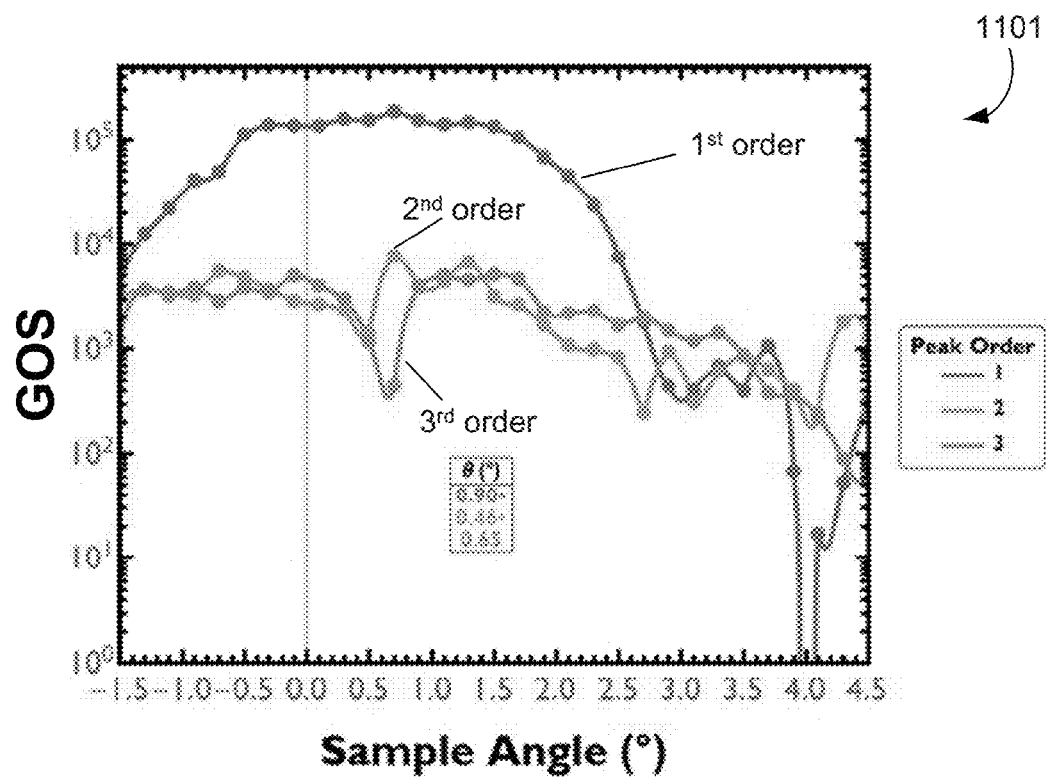
FIG. 11A shows a GOS vs sample angle plot for a structure measured with no ROE ($\chi=0.0°$) and a GOS plot for a structure measured with an ROE of $\chi=-2.0°$.
Figure 11A:
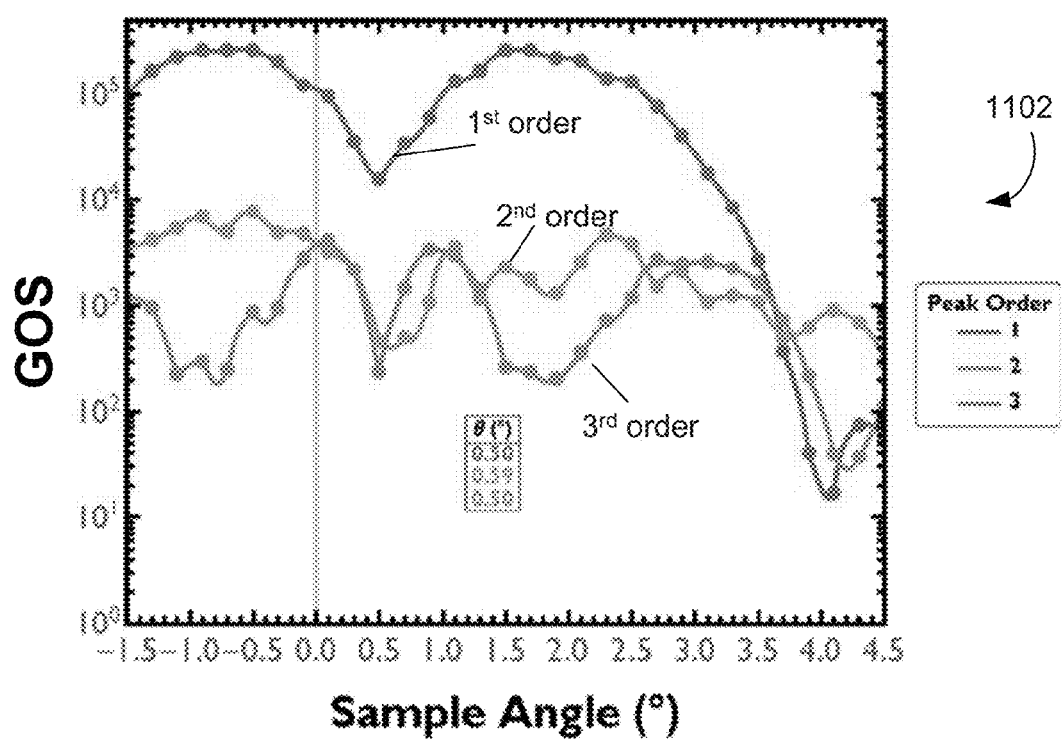

Returning to FIG. 9A, image 902 represents a scattering pattern at $\theta=-1.0°$ with no ROE ($\chi=0.0°$) and image 903 represents a scattering pattern at $\theta=-1.0°$ and a ROE of $\chi=3.0°$. In this example, at a sample rotation angle of $\theta=-1.0°$ the component of tilt in the sample is cancelled and so the scattering patterns are symmetric about the measurement axis. However, with the ROE, the brightest intensities are confined to a narrower band. This effect reduces the effect of noise in the data and can significantly reduce the time to determine when the scattering pattern has become symmetric about the measurement rotation axis. The effect may also be seen in the GOS vs sample angle plots, which show a more defined minimum with the ROE. This can be seen in FIG. 10, which shows a GOS plot 1001 for a structure measured with no ROE ($\chi=0°$) and a GOS plot 1002 for a structure measured with an ROE of $\chi=-3.0°$. The ROE changes the scattering pattern, but the symmetry and thus central minimum for 0 at $-1.0°$ is the same. In some embodiments, ROE may speed measurement time by allowing the use of lower order peaks to determine the asymmetry. FIG. 11A shows a GOS vs sample angle plot 1101 for a structure measured with no ROE ($\chi=0.0°$) and a GOS plot 1102 for a structure measured with an ROE of $\chi=-2.0°$. In plot 1101, the first order peak is unusable, with no minimum, while the first order peak in plot 1102 has a defined minimum and is usable. This demonstrates that if the scattering intensities are low and noise is significant, ROE enhances the ability to detect alignment.

Figure 11B:
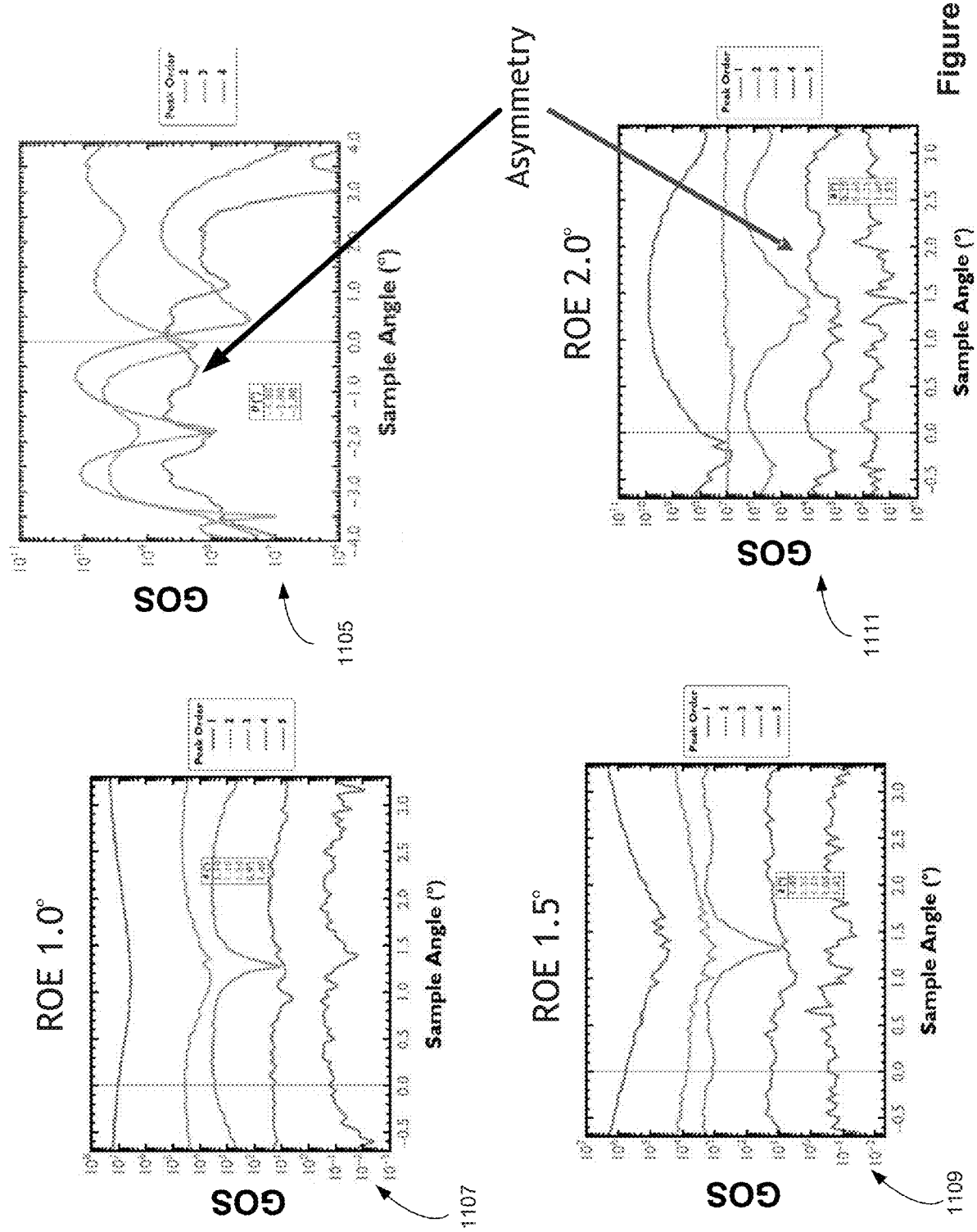
FIG. 11B shows GOS plots that illustrate how ROE may be applied to detect asymmetry using low resolution or high noise data.

FIG. 11B demonstrates how ROE may be applied to detect asymmetry using low resolution or high noise data. GOS plot 1105 reflects data obtained using the Advance Photon Source (APS) at Argonne National Labs; GOS plots 1107, 1109, and 1111 reflect data obtained from the same structure using a laboratory tool with ROE of 1.0°, 1.5°, and 2.0°, respectively. Focusing on the fourth order (see arrows), the asymmetry on the much less sensitive lab tool is apparent for in GOS plot 1111 for ROE 2.0°. This is a result of using ROE to thin the scattering intensity region when there are signal to noise and resolution limitations.

As described above, ROE increases the component of tilt that is not currently being measured. Some samples may have an actual tilt in this direction; if large enough, this intrinsic tilt can have the same effects as applying a ROE. In such cases, the intensity may be thinned without applying an ROE. In some implementations, some (even if a small) amount of tilt exists in the sample in this direction such that the total tilt in the sample in the direction not being measured is the intrinsic tilt plus any ROE applied. If ROE is applied, example ROE angles may be $\chi=+/-0.1°-5°$. If the ROE angle is too high, the signal may be reduced too much.

Figure 12A:
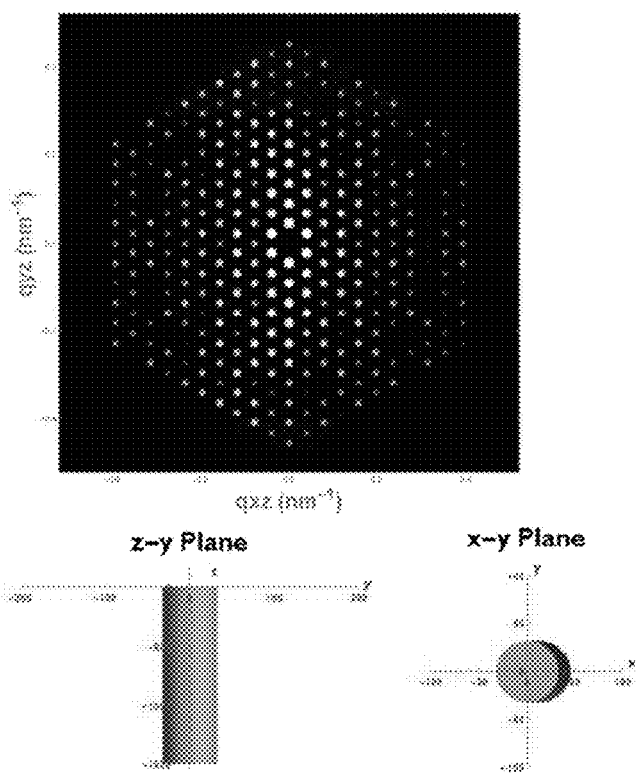
FIGS. 12A-12C show simulated scattering plots for structures having a certain tilt ($\theta=0.5°$) and varying sidewall angles (SWAs).
Figure 12B:
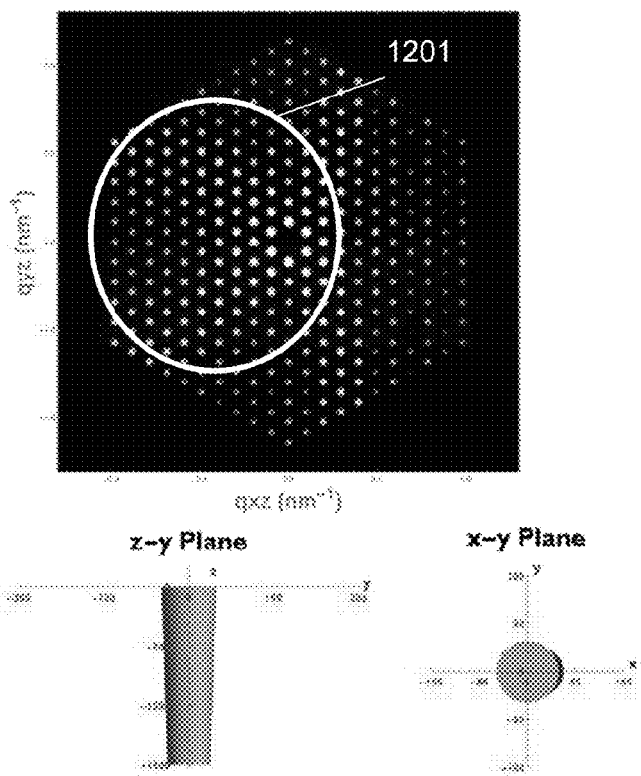
Figure 12C:
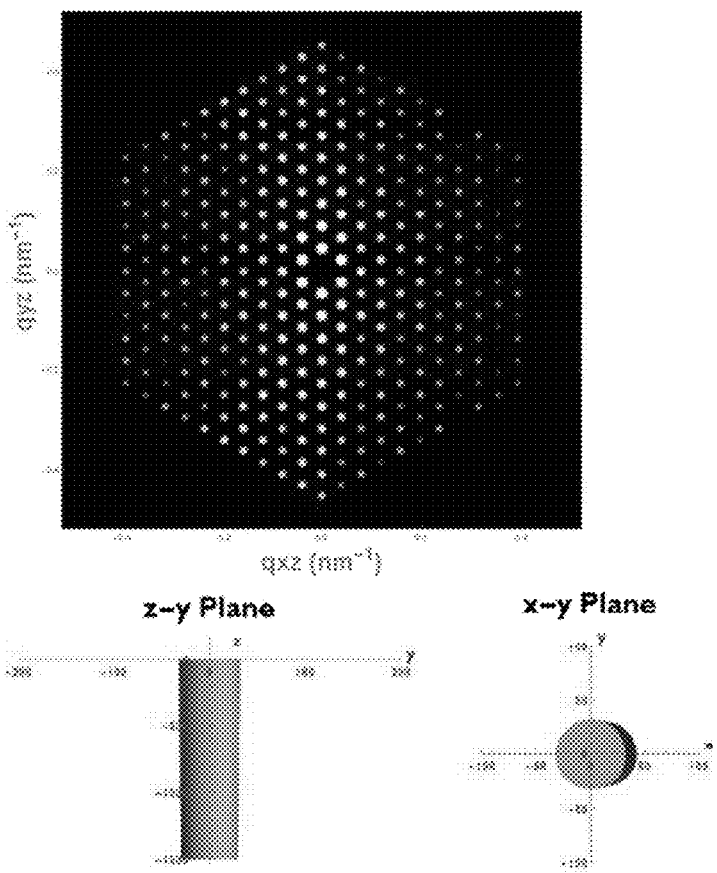

In addition to determining tilt of HAR structures, the methods may be used to obtain information about the sidewall angle of HAR holes or other structures. FIGS. 12A-12C show simulated scattering plots for structures having a certain tilt ($\theta=0.5°$) and varying sidewall angles (SWAs). In particular, the structure in FIG. 12A has vertical sidewalls (SWA of 90°), the structure in FIG. 12B has a SWA of 89.7° and the structure in FIG. 12C has a SWA of 89.9°. Comparing the structures in FIGS. 12A and 12B, the latter has an additional curved region of brightness as indicated at 1201. As the sidewall becomes more vertical, the curvature of the bright band decreases as shown in FIG. 12C, and for vertical sidewalls (FIG. 12A), a single bright band of curvature is observed. The tilt of the structure also has an effect on the curvature of the bright region observed for structures having non-vertical sidewalls; as the structures become more tilted, the curvature of the bright region is reduced. In some embodiments, models or other techniques may be employed to determine an average SWA of a sample. Also in some embodiments, observation of a curved region or lack thereof may be used to determine the presence or absence of a non-vertical sidewall.

Figure 13A:
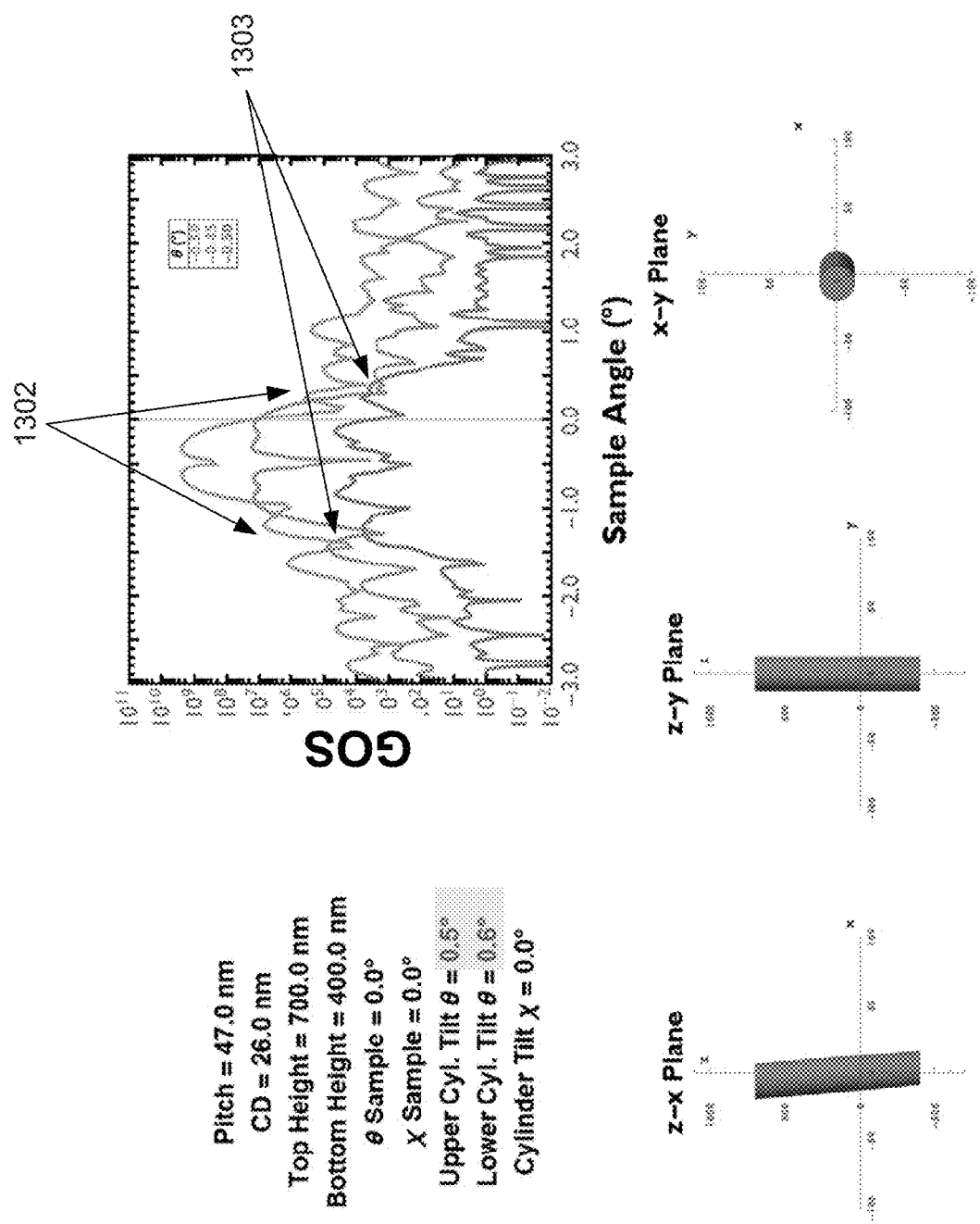
FIG. 13A-13D show simulated GOS vs. sample angle plots for various kinked structures.
Figure 13B:
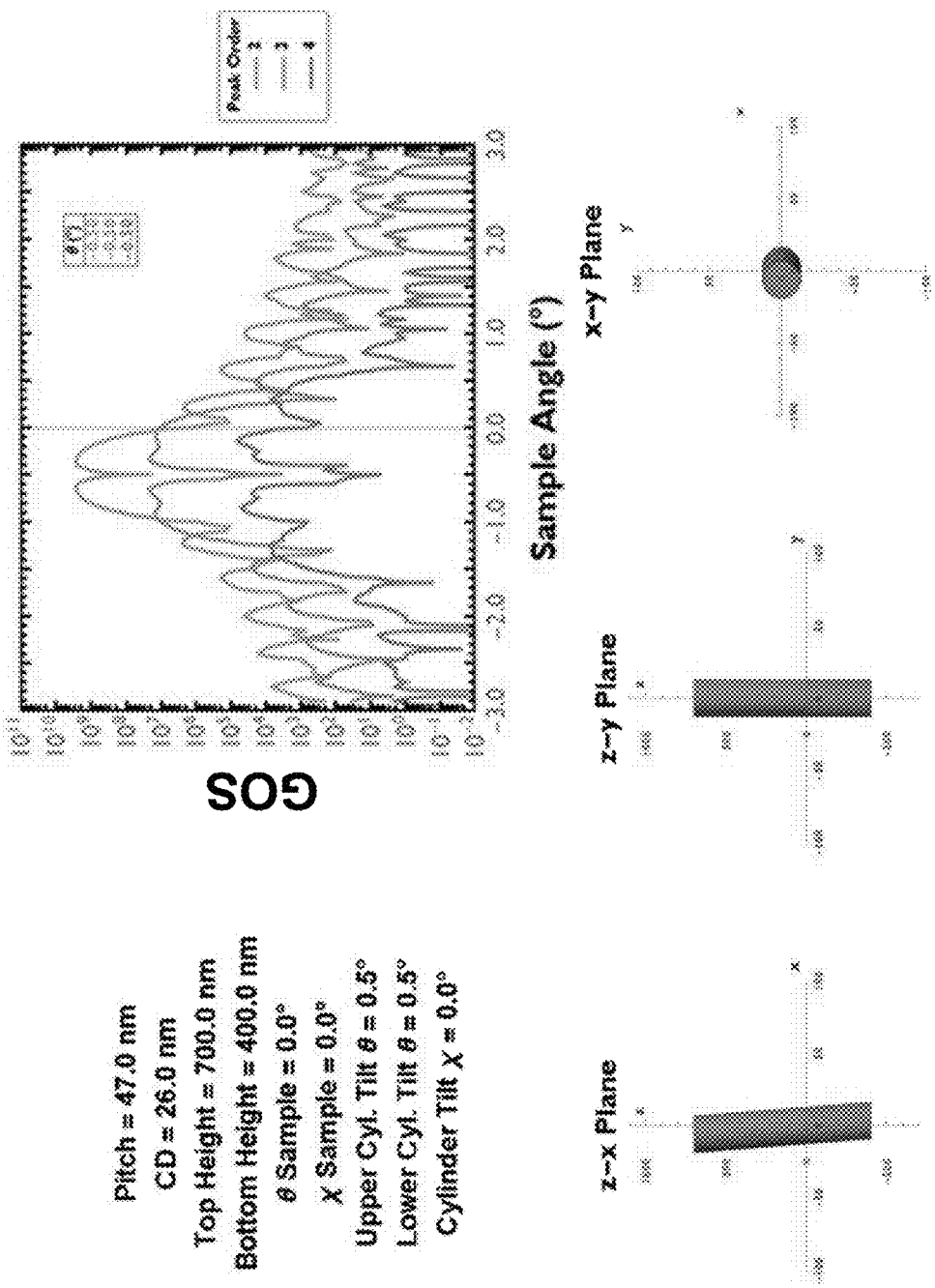
Figure 13C:
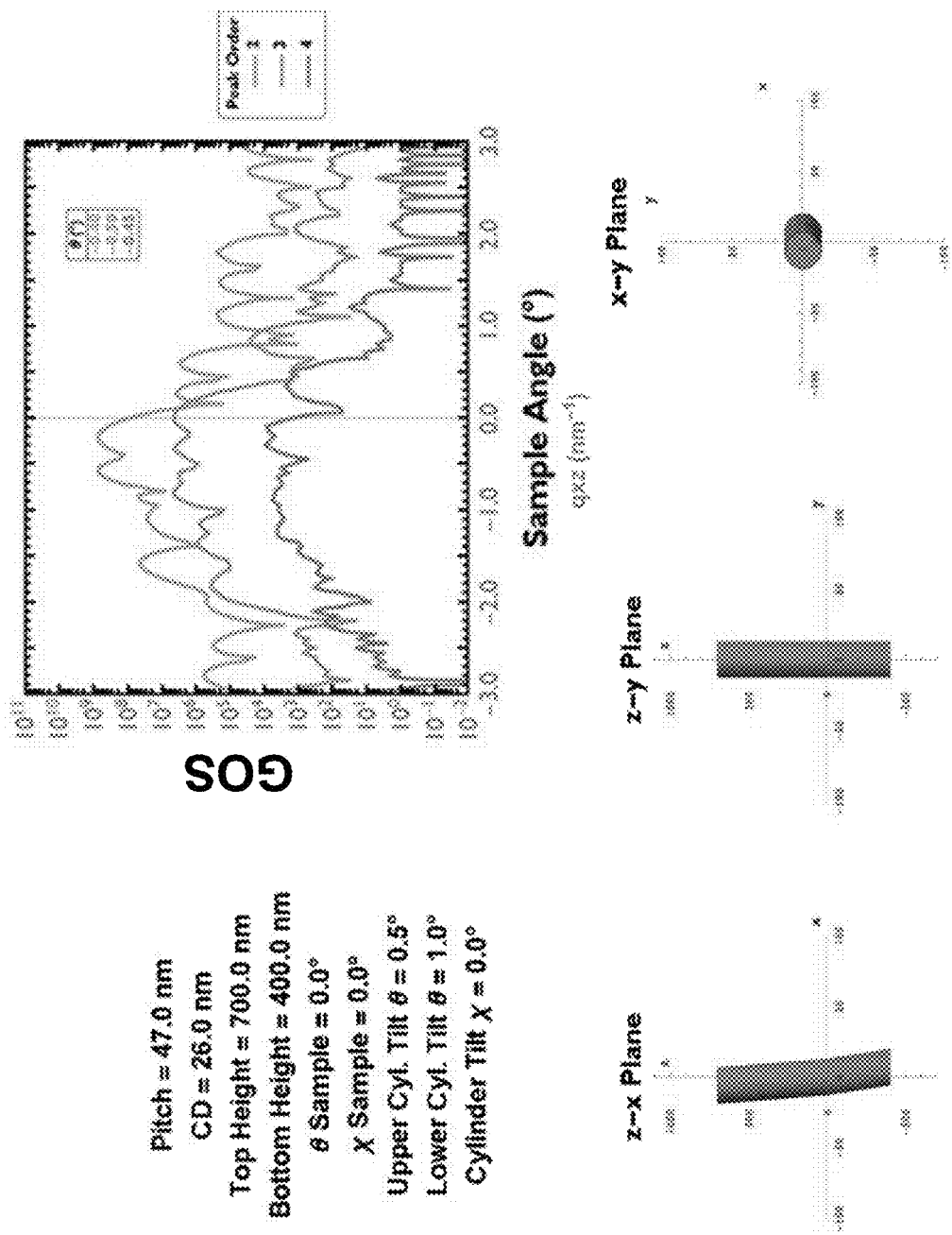
Figure 13D:
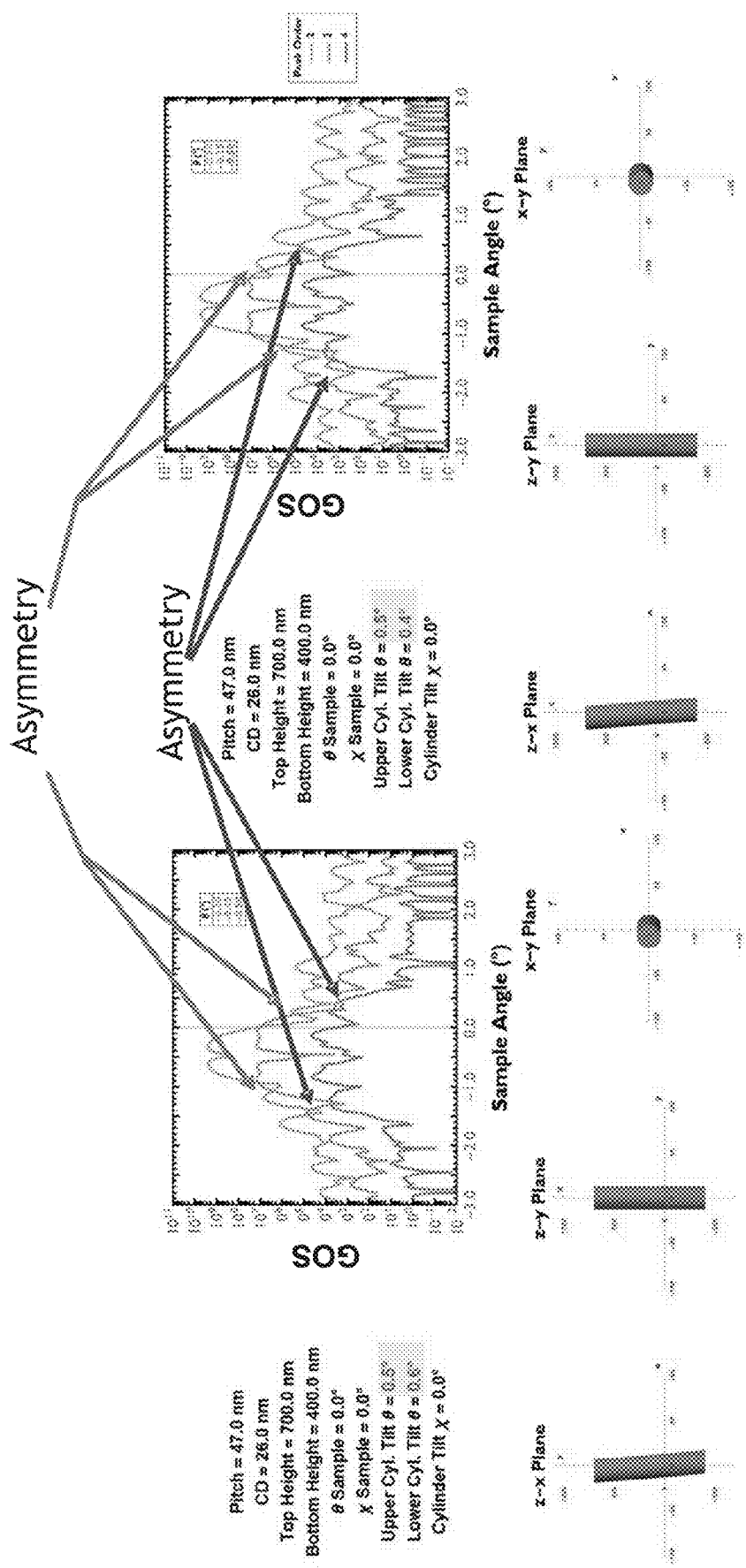
Figure 14A:
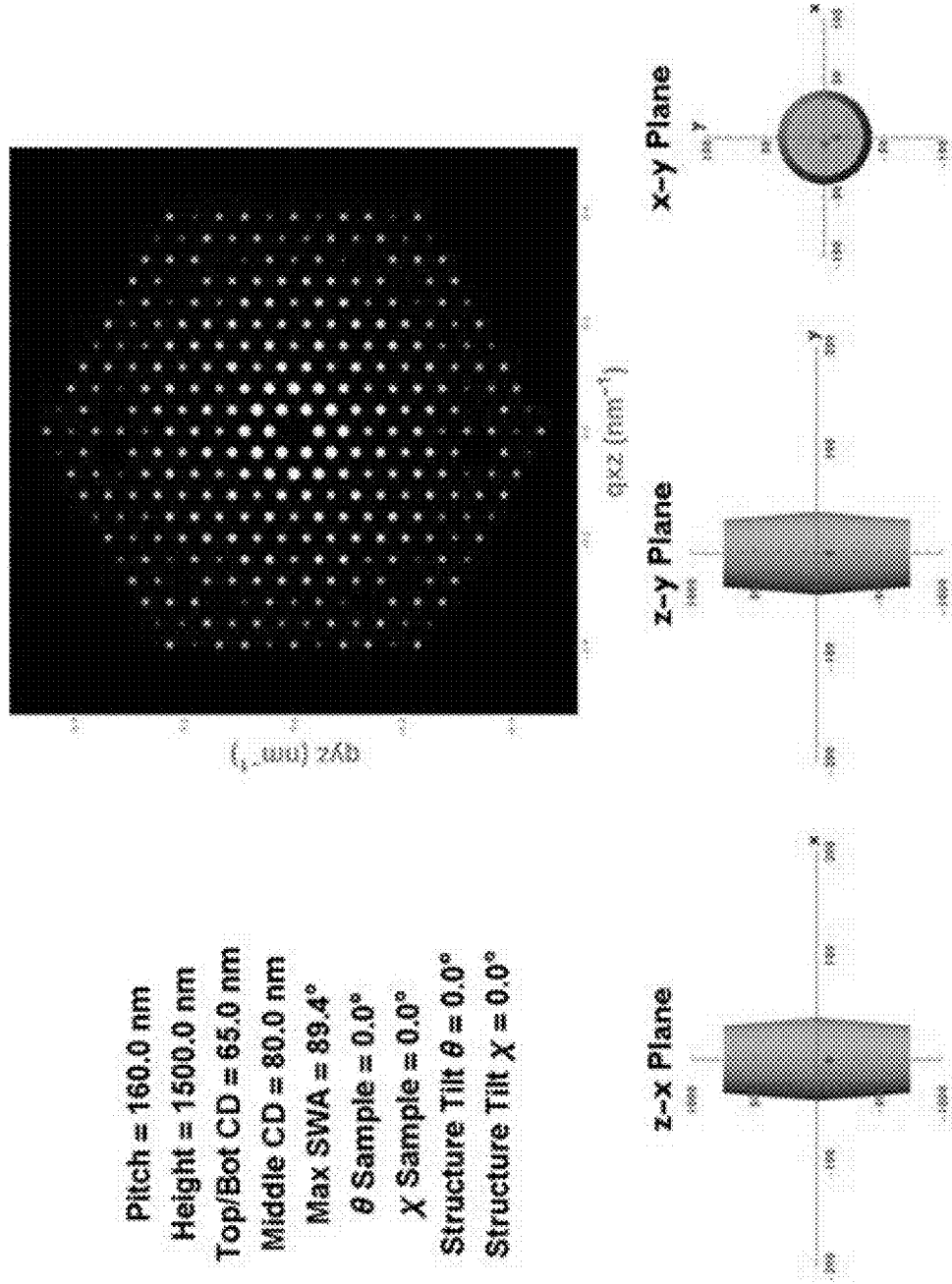
FIGS. 14A and 14B show simulated scattering patterns for various bowed structures.
Figure 14B:
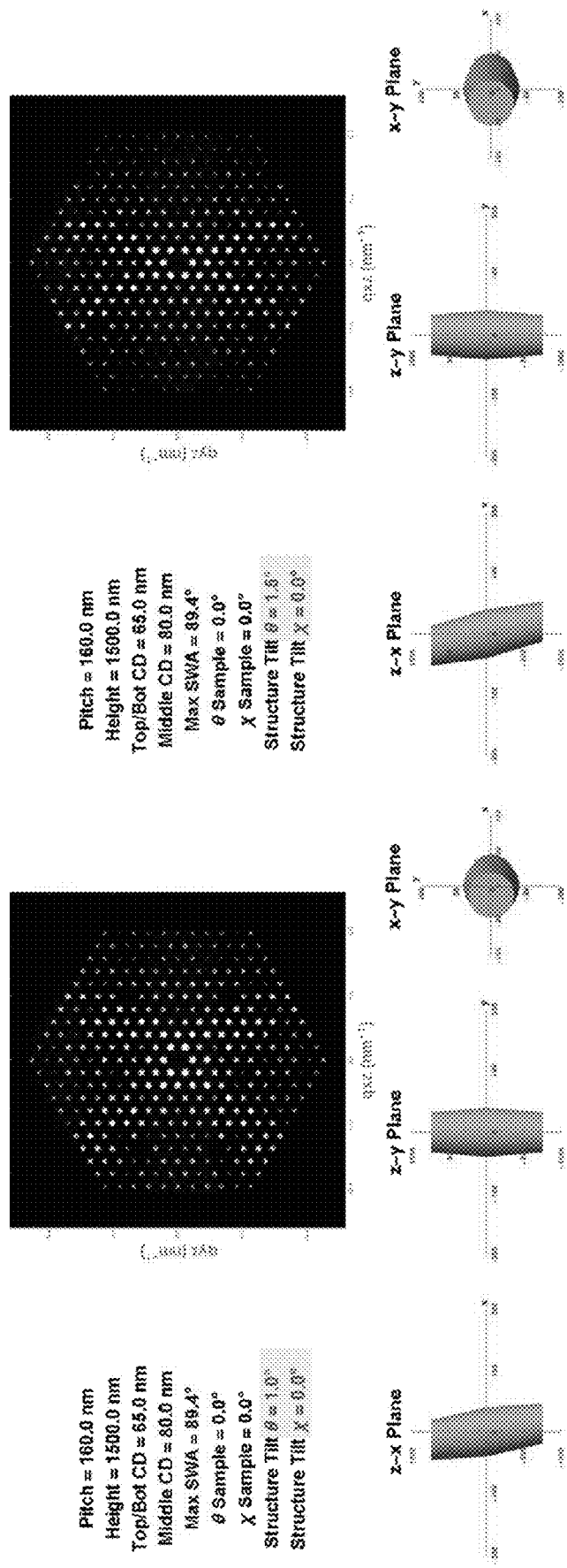

Information may also be obtained about "kinked" structures, i.e., structures having multiple tilts. FIG. 13A shows an example of such a structure. The cylindrical hole may be characterized as two cylinders, an upper cylinder and a lower cylinder. The tilt of the upper cylinder in the z-x plane is 0.5° and the tilt of the lower cylinder in the z-x plane is 0.6°. Asymmetries 1302 and 1303 about the central minima are observed in the second and third peak order curves of the simulated GOS vs sample angle plot. This can be compared to FIG. 13B for which the curves are symmetric about the central minima for the case where the upper and lower cylinders have the same tilt (i.e., there is no kinking). Notably, if the secondary tilt is significantly greater (e.g., 0.8° for the lower cylinder and 0.5° for the upper cylinder), the central minimum diminishes, until at certain point no order of the GOS vs sample angle curve contains an obvious central minimum. See, e.g., FIG. 13C.

Information about the shift in tilt can also be found from the GOS vs sample angle plots. This is demonstrated in the simulated GOS vs sample angle plots of FIG. 13D. The left plot is for a structure in which the lower cylinder has a 0.1° greater tilt than the upper cylinder and the right plot is for a structure in which the lower cylinder is 0.1° less tilted than the upper cylinder. As indicated in the Figure, the asymmetry switches from the left to the right side of the plot.

Another phenomenon that may be observed using the TSSA methods described herein is bowing. Bowed structures are structures for which the top and bottom critical dimensions differ from the middle critical dimension. Whereas kinked structures can be approximated as two stacked cylinders, a bowed structure may be characterized as two stacked cones. When an x-ray beam is aligned to the bowed structures, the resulting pattern is symmetric about the horizontal and vertical axes, as shown in the simulated scattering pattern of FIG. 14A. When the bowed structures are tilted, the scattering pattern trends as described above for cylindrical structures. See, FIG. 14B. When there is only one component of tilt, the pattern is symmetric about an axis, with the bowed structure resulting in an additional curved region of brightness. As the structure becomes closer to vertical (SWA is closer to 90°), the curvature of the bright region reduces. If the SWA is too great, it can be difficult to separate the bright bands. However, individual curvatures of the bands can be resolved better by reducing the structure tilt (i.e., using the rotation stage to align the sample along tilt). Detecting bowing can be particularly useful after mask strip, for example, which can introduce bowing.

The methods described herein may be implemented to determine characteristics of various structures, including but not limited to, 3D NAND and DRAM memory holes and shallow trench isolation (STI). The methods may also be implemented for overlay metrology, particularly in applications where the hardmask is optically opaque and optical metrology is insufficient. Similarly, the methods may be particularly useful for low atomic number materials that do not scatter x-rays well and for which it can be difficult to achieve the resolution required for CD-SAXS. While the description above refers to HAR structures, it will be understood that the techniques may be applied to structures having a variety of aspect ratios. For example, the structures may have aspect ratios greater than 2:1, greater than 5:1, greater than 10:1, or greater than 30:1.

Figure 15:
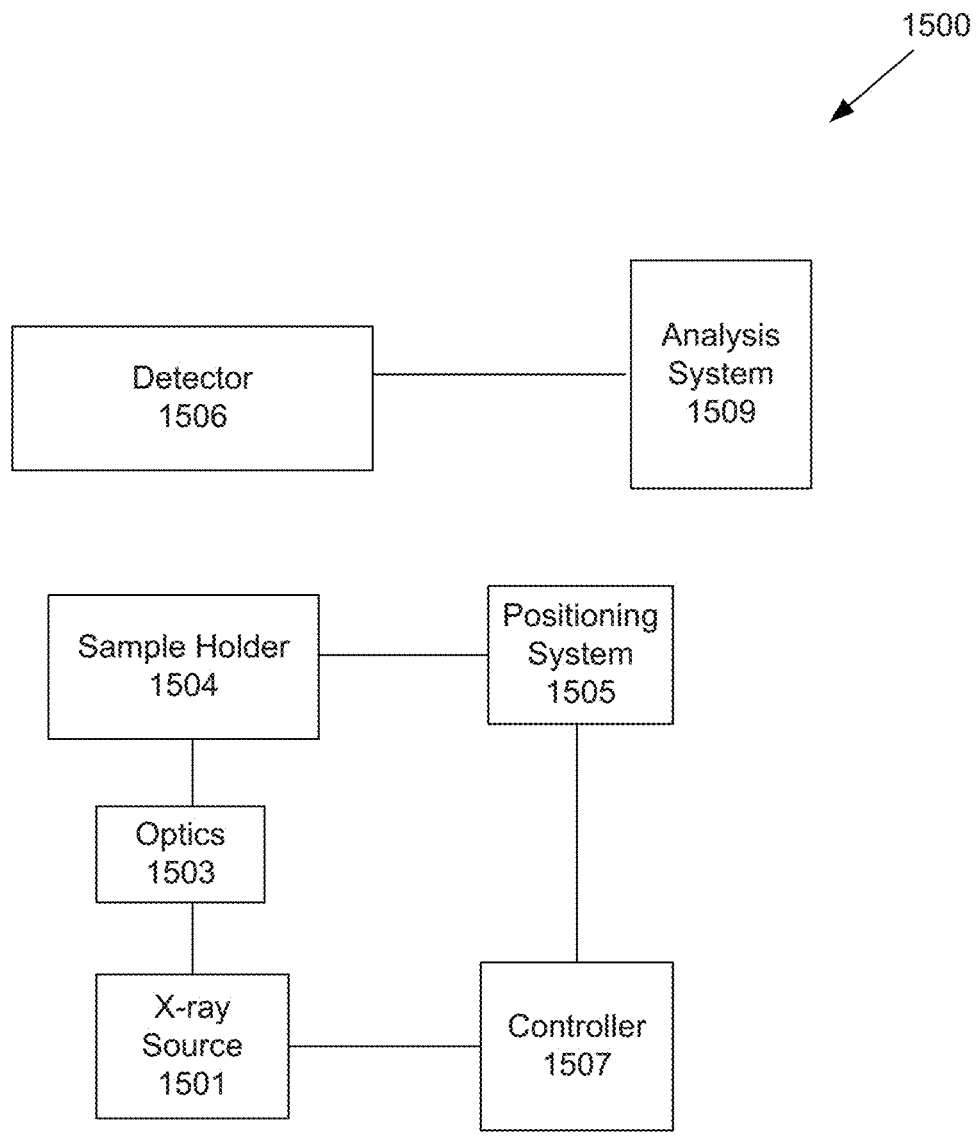
FIG. 15 shows an example of a block diagram of system 1500 that may be used to perform implementations of the methods described herein.

FIG. 15 shows an example of a block diagram of system 1500 that may be used to perform implementations of the methods described herein. The system 1500 includes a sample holder 1504, which may be any appropriate holder such as grip chuck. It is understood that a sample holder 1504 may use mechanical devices such as chucks, clamps or pinchers to hold a sample, and/or may use suction to hold the sample in place. The sample holder 1504 may have a surface on which the sample lies or the sample may be held only at the edges of the sample. The sample may be any appropriate size, including a semiconductor wafer or a portion thereof. The sample holder 1504 is connected to a positioning system 1505 that is configured to rotate the sample along one or more measurement axes as described above. The positioning system 1505 may also be configured to rotate the sample for ROE and otherwise translate or orient the sample appropriately. The positioning system 1505 may include various mechanical or motorized elements such as rotation and tilt stages, linear stages, goniometer stages, and the like. Optics 1503 may be used to direct x-rays from x-ray source 1501 onto a sample held by sample support 1504.

Any appropriate x-ray source including solid anode, liquid metal jet, inverse Compton scattering, and compact electron storage ring sources may be used. Similarly, any appropriate detector including CCD, hybrid photon counting, and image plate detectors may be used.

In operation, the positioning system 1505 orients and rotates the sample holder 1504 as described above, with the incident x-rays detected by a detector 1506. A controller 1507 may be used to control the operations of the x-ray source 1501 and positioning system 1505. An analysis system 1509 is configured to receive signals from the detector 1506 and analyze the sample as described above.

Example spot sizes may range from 40 microns-300 microns. Depending on the pitch of the structures, this may include hundreds or thousands of structures. Multiple spots may be analyzed across a wafer.

According to various embodiments, the system 1500 may be implemented in a manufacturing or research and development setting. In a manufacturing setting, the system 1500 may be configured to receive a semiconductor wafer as it exits a tool, for example, an etch tool, or be implemented within a semiconductor processing chamber itself.

The methods described herein may be implemented for characterization of one or more of tilt, sidewall angle, kinked structures, and bowing in high aspect ratio (HAR) structures. According to various embodiments, the characterization may include information about the presence or absence of a tilt, sidewall angle, kinked structure, or bowing, or information including the magnitude and or direction of the tilt, sidewall angle, kinking, or bowing.

The controller 1507 may be programmed to control any of the processes disclosed herein, such as processes for controlling the positioning system 1505, as well as other processes or parameters not discussed herein. Broadly speaking, the controller 1507 may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system.

The controller 1507, in some implementations, may be a part of or coupled to a computer that is integrated with, coupled to the system 1500, otherwise networked to the system 1500, or a combination thereof. For example, the controller 1507 may be in the "cloud" or all or a part of a fab host computer system, which can allow for remote access of the wafer processing. The computer may enable remote access to the system 1500 to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system 1500 from the remote computer. In some examples, the controller 1507 receives instructions in the form of data, which specify parameters for each of the processing steps to be performed during one or more operations. It should be understood that the parameters may be specific to the type of process to be performed and the type of tool that the controller 1507 is configured to interface with or control. Thus as described above, the controller 1507 may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems according to the present disclosure may be mounted in or part of semiconductor processing tools with a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the system, the controller 1507 might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

We claim:

1. A method comprising:
   illuminating a sample including an array of structures with x-ray radiation such that the sample scatters the x-ray radiation;
   rotating the sample through a series of angular positions around a first measurement axis;
   at each angular position of the series of angular positions around the first measurement axis, detecting a pattern of intensity of the scattered x-ray radiation; and
   determining, based on a symmetry of the pattern of intensity of the scattered x-ray radiation, an average tilt of the array of structures in a first plane.

2. The method of claim 1, wherein determining, based on the symmetry of the pattern of intensity of the scattered x-ray radiation, the average tilt of the array of structures in the first plane comprises determining the average tilt of the array of structures in the first plane without a reference to a model.

3. The method of claim 1, wherein determining, based on the symmetry of the pattern of intensity of the scattered x-ray radiation, the average tilt of the array of structures in the first plane further comprises determining a magnitude and direction of the average tilt of the array of structures in the first plane.

4. The method of claim 1, further comprising:
   rotating the sample through a series of angular positions around a second measurement axis;
   at each angular position of the series of angular positions around the second measurement axis, detecting a pattern of intensity of the scattered x-ray radiation; and
   determining, based on a symmetry of the pattern of intensity of the scattered x-ray radiation, an average tilt of the array of structures in a second plane.

5. The method of claim 4, further comprising: determining an average overall tilt of the array of structures from the average tilt in the first plane and the average tilt in the second plane.

6. The method of claim 4, wherein the first measurement axis and the second measurement axis are orthogonal.

7. The method of claim 4, wherein the first measurement axis and the second measurement axis are not orthogonal.

8. The method of claim 1, further comprising:
   rotating the sample by an angle x around an axis orthogonal to the first measurement axis prior to rotating the sample through the series of angular positions around the first measurement axis.

9. The method of claim 1, wherein determining, based on the symmetry of the pattern of intensity of the scattered x-ray radiation, the average tilt of the array of structures in the first plane comprises comparing peak intensities of a right side of the pattern of intensity of the scattered x-ray radiation with peak intensities of a left side of the pattern of intensity of the scattered x-ray radiation.

10. The method of claim 1, wherein determining, based on the symmetry of the pattern of intensity of the scattered x-ray radiation, the average tilt of the array of structures in the first plane comprises plotting goodness of symmetry (GOS) values vs sample angles, wherein a GOS value at a sample angle is given by $$GOS = \sum_{i=1}^{n} (\text{Intensity } Left_i - \text{Intensity } Right_i)^2$$

where there are n peaks.

11. The method of claim 1, wherein determining, based on the symmetry of the pattern of intensity of the scattered x-ray radiation, the average tilt of the array of structures in the first plane further comprises determining a sample angle at which the pattern of intensity of the scattered x-ray radiation is symmetric.

12. The method of claim 1, wherein determining, based on the symmetry of the pattern of intensity of the scattered x-ray radiation, the average tilt of the array of structures in the first plane comprises determining the average tilt of the array of structures in the first plane to a resolution of at least 0.05°.

13. A method comprising:
   illuminating a sample including an array of structures with x-ray radiation such that the sample scatters the x-ray radiation;
   rotating the sample through a series of angular positions around a first measurement axis;
   at each angular position of the series of angular positions around the first measurement axis, detecting a pattern of intensity of the scattered x-ray radiation; and
   determining, based on a symmetry of the pattern of intensity of the scattered x-ray radiation, if the array of structures is characterized by one or more of: a tilt, a non-vertical sidewall angle, bowing, or kinking.

* * * * *